United States Patent
Mayer et al.

(10) Patent No.: US 10,268,692 B2
(45) Date of Patent: Apr. 23, 2019

(54) MULTI-PROCEDURE SUPPORT IN DATA MIGRATION

(71) Applicant: SAP SE, Walldorf (DE)

(72) Inventors: Martin Mayer, Heidelberg (DE);
Juergen Specht, Gerabronn (DE);
Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 242 days.

(21) Appl. No.: 15/433,682

(22) Filed: Feb. 15, 2017

(65) Prior Publication Data

US 2018/0232382 A1 Aug. 16, 2018

(51) Int. Cl.
*G06F 17/30* (2006.01)

(52) U.S. Cl.
CPC .. *G06F 17/30079* (2013.01); *G06F 17/30221* (2013.01)

(58) Field of Classification Search
CPC ........ G06F 17/30312; G06F 17/30861; G06F 17/30079; G06F 17/30221
See application file for complete search history.

(56) References Cited

U.S. PATENT DOCUMENTS

| | | | |
|---|---|---|---|
| 7,523,142 B2 | 4/2009 | Driesen et al. | |
| 7,657,575 B2 | 2/2010 | Eberlein et al. | |
| 7,720,992 B2 | 5/2010 | Brendle et al. | |
| 7,734,648 B2 | 6/2010 | Eberlein | |
| 7,739,387 B2 | 6/2010 | Eberlein et al. | |
| 7,962,920 B2 | 6/2011 | Gabriel et al. | |
| 7,971,209 B2 | 6/2011 | Eberlein et al. | |
| 8,126,919 B2 | 2/2012 | Eberlein | |
| 8,200,634 B2 | 6/2012 | Driesen et al. | |
| 8,225,303 B2 | 7/2012 | Wagner et al. | |
| 8,250,135 B2 | 8/2012 | Driesen et al. | |
| 8,291,038 B2 | 10/2012 | Driesen | |
| 8,301,610 B2 | 10/2012 | Driesen et al. | |
| 8,356,010 B2 | 1/2013 | Driesen | |
| 8,375,130 B2 | 2/2013 | Eberlein et al. | |
| 8,380,667 B2 | 2/2013 | Driesen | |

(Continued)

OTHER PUBLICATIONS

Jong et al., Zero-Downtime SQL Database Schema Evolution for Continuous Deployment, 10 pages (Year: 2017).*

(Continued)

*Primary Examiner* — Noosha Arjomandi
(74) *Attorney, Agent, or Firm* — Fish & Richardson P.C.

(57) ABSTRACT

Implementations include actions of initiating a procedure on an application that interacts with a database system having a start schema, through which a first version of the application interacts with tables, providing a bridge schema including table views to each table of the start schema, switching a first version of the application to interact through the bridge schema, creating a shadow field in a table, the shadow field corresponding to a field of the table that is to undergo a change during an upgrade from the first version to a second version, providing a trigger in the start schema, the trigger executing a transformation between the field and the shadow field during the upgrade, modifying the table in the start schema to a target structure to change a parameter of the shadow field or the field of the table, and switching the second version to interact through the start schema.

20 Claims, 18 Drawing Sheets

(56) References Cited

U.S. PATENT DOCUMENTS

| | | | |
|---|---|---|---|
| 8,402,086 B2 | 3/2013 | Driesen et al. | |
| 8,407,297 B2 | 3/2013 | Schmidt-Karaca et al. | |
| 8,434,060 B2 | 4/2013 | Driesen et al. | |
| 8,392,573 B2 | 5/2013 | Lehr et al. | |
| 8,467,817 B2 | 6/2013 | Said et al. | |
| 8,473,942 B2 | 6/2013 | Heidel et al. | |
| 8,479,187 B2 | 7/2013 | Driesen et al. | |
| 8,555,249 B2 | 10/2013 | Demant et al. | |
| 8,560,876 B2 | 10/2013 | Driesen et al. | |
| 8,566,784 B2 | 10/2013 | Driesen et al. | |
| 8,572,369 B2 | 10/2013 | Schmidt-Karaca et al. | |
| 8,604,973 B2 | 12/2013 | Schmidt-Karaca et al. | |
| 8,612,406 B1 | 12/2013 | Said et al. | |
| 8,645,483 B2 | 2/2014 | Odenheimer et al. | |
| 8,706,772 B2 | 4/2014 | Hartig et al. | |
| 8,751,573 B2 | 6/2014 | Said et al. | |
| 8,762,929 B2 | 6/2014 | Driesen | |
| 8,793,230 B2 | 7/2014 | Engelko et al. | |
| 8,805,986 B2 | 8/2014 | Driesen et al. | |
| 8,868,582 B2 | 10/2014 | Fitzer et al. | |
| 8,875,122 B2 | 10/2014 | Driesen et al. | |
| 8,880,486 B2 | 11/2014 | Driesen et al. | |
| 8,924,384 B2 | 12/2014 | Driesen et al. | |
| 8,924,565 B2 | 12/2014 | Lehr et al. | |
| 8,972,934 B2 | 3/2015 | Driesen et al. | |
| 8,996,466 B2 | 3/2015 | Driesen | |
| 9,003,356 B2 | 4/2015 | Driesen et al. | |
| 9,009,105 B2 | 4/2015 | Hartig et al. | |
| 9,026,502 B2 | 5/2015 | Driesen et al. | |
| 9,026,857 B2 | 5/2015 | Becker et al. | |
| 9,031,910 B2 | 5/2015 | Driesen | |
| 9,032,406 B2 | 5/2015 | Eberlein | |
| 9,069,832 B2 | 6/2015 | Becker et al. | |
| 9,069,984 B2 | 6/2015 | Said et al. | |
| 9,077,717 B2 | 7/2015 | Said et al. | |
| 9,122,669 B2 | 9/2015 | Demant et al. | |
| 9,137,130 B2 | 9/2015 | Driesen et al. | |
| 9,182,979 B2 | 11/2015 | Odenheimer et al. | |
| 9,183,540 B2 | 11/2015 | Eberlein et al. | |
| 9,189,226 B2 | 11/2015 | Driesen et al. | |
| 9,223,985 B2 | 12/2015 | Eberlein et al. | |
| 9,229,707 B2 | 1/2016 | Borissov et al. | |
| 9,256,840 B2 | 2/2016 | Said et al. | |
| 9,262,763 B2 | 2/2016 | Peter et al. | |
| 9,274,757 B2 | 3/2016 | Said et al. | |
| 9,348,997 B2 * | 5/2016 | Schulz | G06F 21/51 |
| 9,275,120 B2 | 6/2016 | Mayer et al. | |
| 9,436,724 B2 | 9/2016 | Driesen et al. | |
| 2003/0093443 A1 * | 5/2003 | Huxoll | G06F 11/1466 |
| 2004/0083355 A1 * | 4/2004 | Smith | G06F 9/4416 |
| | | | 713/1 |
| 2006/0098253 A1 | 5/2006 | Masuno et al. | |
| 2009/0144720 A1 * | 6/2009 | Roush | G06F 8/65 |
| | | | 717/171 |
| 2009/0254572 A1 * | 10/2009 | Redlich | G06Q 10/06 |
| 2010/0153341 A1 | 6/2010 | Driesen et al. | |
| 2012/0036165 A1 * | 2/2012 | Driesen | G06F 17/30286 |
| | | | 707/803 |
| 2014/0359594 A1 | 12/2014 | Erbe et al. | |
| 2014/0379648 A1 * | 12/2014 | Chiu | G06F 17/30174 |
| | | | 707/624 |
| 2015/0019487 A1 * | 1/2015 | Buehne | G06F 17/30377 |
| | | | 707/632 |
| 2015/0106140 A1 | 4/2015 | Biewald et al. | |
| 2015/0113523 A1 * | 4/2015 | Nichols | G06F 9/4451 |
| | | | 717/176 |
| 2016/0026514 A1 * | 1/2016 | Cucinotta | G06F 9/54 |
| | | | 718/105 |
| 2016/0063050 A1 * | 3/2016 | Schoen | G06F 17/303 |
| | | | 707/690 |
| 2016/0098443 A1 * | 4/2016 | Specht | G06F 8/65 |
| | | | 707/634 |
| 2016/0246833 A1 * | 8/2016 | Eberlein | G06F 17/30351 |
| 2017/0031780 A1 * | 2/2017 | Biewald | G06F 17/303 |
| 2017/0123787 A1 * | 5/2017 | Burkhardt | G06F 8/66 |
| 2017/0139960 A1 * | 5/2017 | Lober | G06F 17/30321 |
| 2017/0277698 A1 * | 9/2017 | Heard | G06F 17/30079 |
| 2017/0344362 A1 * | 11/2017 | Burkhardt | G06F 8/656 |
| 2018/0052620 A1 * | 2/2018 | Driesen | G06F 17/303 |
| 2018/0150497 A1 * | 5/2018 | Stephen | G06F 8/65 |

OTHER PUBLICATIONS

Matsuzawa et al., The Quick Migration of File Servers, 11 pages. (Year: 2018).*
U.S. Appl. No. 14/960,983, filed Dec. 7, 2015, Eberlein, et al.
U.S. Appl. No. 15/083,918, filed Mar. 29, 2016, Eberlein, et al.
U.S. Appl. No. 15/087,677, filed Mar. 31, 2016, Eberlein, et al.
U.S. Appl. No. 15/167,746, filed May 27, 2016, Burkhardt et al.
U.S. Appl. No. 15/285,715, filed Oct. 7, 2016, Specht et al.
U.S. Appl. No. 15/285,745, filed Oct. 5, 2016, Mayer.

* cited by examiner

MULTI-PROCEDURE SUPPORT IN DATA MIGRATION

BACKGROUND

Entities, such as software developers and/or vendors, provide software and services. Example software can include enterprise software. In some examples, enterprise software can include application software (an application) that interacts with one or more databases. For example, an application can be hosted on one or more application servers, and a user can interact with the application using a client device. In some examples, user interaction can result in data being read from, written to, and/or modified within one or more databases.

During a lifecycle of the application and/or database, one or more maintenance operations may be required. Example maintenance operations include upgrading, configuring, patching, and testing. In order to perform such maintenance procedures, the application and/or database may be taken offline, such that users are unable to interact with the application and/or database, which is referred to as downtime. Although software providers have strived to minimize downtime, achieving zero downtime during such maintenance procedures has been an elusive goal. Further, some maintenance procedures have required, for example, copying of data to separate databases, which can require additional resources (e.g., computer processing, memory).

SUMMARY

Implementations of the present disclosure include computer-implemented methods for data migration in a maintenance procedure executed on a software system. In some implementations, actions include initiating a maintenance procedure on a computer-executable application that interacts with a plurality of tables of a database system, the database system providing a start schema, through which a first version of the application interacts with the plurality of tables, the start schema including the plurality of tables, providing a bridge schema in the database system, the bridge schema including respective table views to each table of the plurality of tables of the start schema, switching the first version of the application to interact with the plurality of tables through the bridge schema, creating a shadow field in a table of the plurality of tables of the database system, the shadow field corresponding to a field of the table that is to undergo a change during an upgrade from the first version of the application to a second version of the application, providing at least one database trigger in the start schema, the at least one database trigger selectively executing a transformation between the field and the shadow field during the upgrade, modifying the table in the start schema to a target structure, modifying including changing at least one parameter of one of the shadow field and the field of the table, and switching the second version of the application to interact with the plurality of tables through the start schema. Other implementations of this aspect include corresponding systems, apparatus, and computer programs, configured to perform the actions of the methods, encoded on computer storage devices.

These and other implementations can each optionally include one or more of the following features: a creating the shadow field includes renaming the field from an original name to a new name, and adding the shadow field in the table, the shadow field comprising the original name; actions further include modifying at least one table view of the bridge schema to reference the new name; actions further include adding a temporary table view to the start schema, the temporary table view referencing the shadow field, which includes a new name with respect to an original name of the field; the respective table view of the bridge schema remains unchanged; actions further include deleting the at least one database trigger in the start schema prior to switching the second version of the application to interact with the plurality of tables through the start schema; and the change includes one or more of a data type change, and a content change.

Implementations of the present disclosure provide one or more of the following example advantages. In some examples, implementations of the present disclosure enable modifications to a table structure to be performed in a single step during an upgrade from the source structure to the target structure, which can include, for example, generic field transformation, executing developer code, and modifying the table key. In traditional systems, such modifications were performed through a sequence of modifications to the table, resulting in longer runtime, as the table content may have had to be processed more than once. Accordingly, implementations of the present disclosure reduce the runtime of a table migration. Implementations of the present disclosure further enable incompatible modifications to a table structure (e.g., deleting fields, modifying the key of the table, and transforming data from fields to be deleted to new fields). Implementations of the present disclosure also enable processing table structure changes hidden from use of the table in parallel to use, where the new structure is prepared hidden (e.g., from an application), and is switched to, which can decrease downtime resulting from the upgrade. Implementations of the present disclosure also enable transforming single table columns only, thereby reducing overall runtime and memory consumption during the transformation run. Implementations also enable transforming a table online, while entries are being read, written and modified, the migration logic being executed within the same database transaction as the data being modified by the application user.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to multi-procedure support in data migration. More particularly, implementations of the present disclosure are directed to supporting complex data migration in a variety of different upgrade procedures, while enabling changing keys and deleting fields, for example. In some implementations, actions include initiating a maintenance procedure on a computer-executable application that interacts with a plurality of tables of a database system, the database system providing a start schema, through which a first version of the application interacts with the plurality of tables, the start schema including the plurality of tables, providing a bridge schema in the database system, the bridge schema including respective table views to each table of the plurality of tables of the start schema, switching the first version of the application to interact with the plurality of tables through the bridge schema, creating a shadow field in a table of the plurality of tables of the database system, the shadow field corresponding to a field of the table that is to undergo a change during an upgrade from the first version of the application to a second version of the application, providing at least one database trigger in the start schema, the at least one database trigger selectively executing a transformation between the field and the shadow field during the upgrade, modifying the table in the start schema to a target structure, modifying including changing at least one parameter of one of the shadow field and the field of the table, and switching the second version of the application to interact with the plurality of tables through the start schema.

In general, and as described in further detail herein, implementations of the present disclosure build on U.S. application Ser. No. 15/285,745, entitled Multi-Procedure Support in Data Migration, and filed on Oct. 5, 2016, the disclosure of which is expressly incorporated herein by reference in the entirety.

Figure 1:
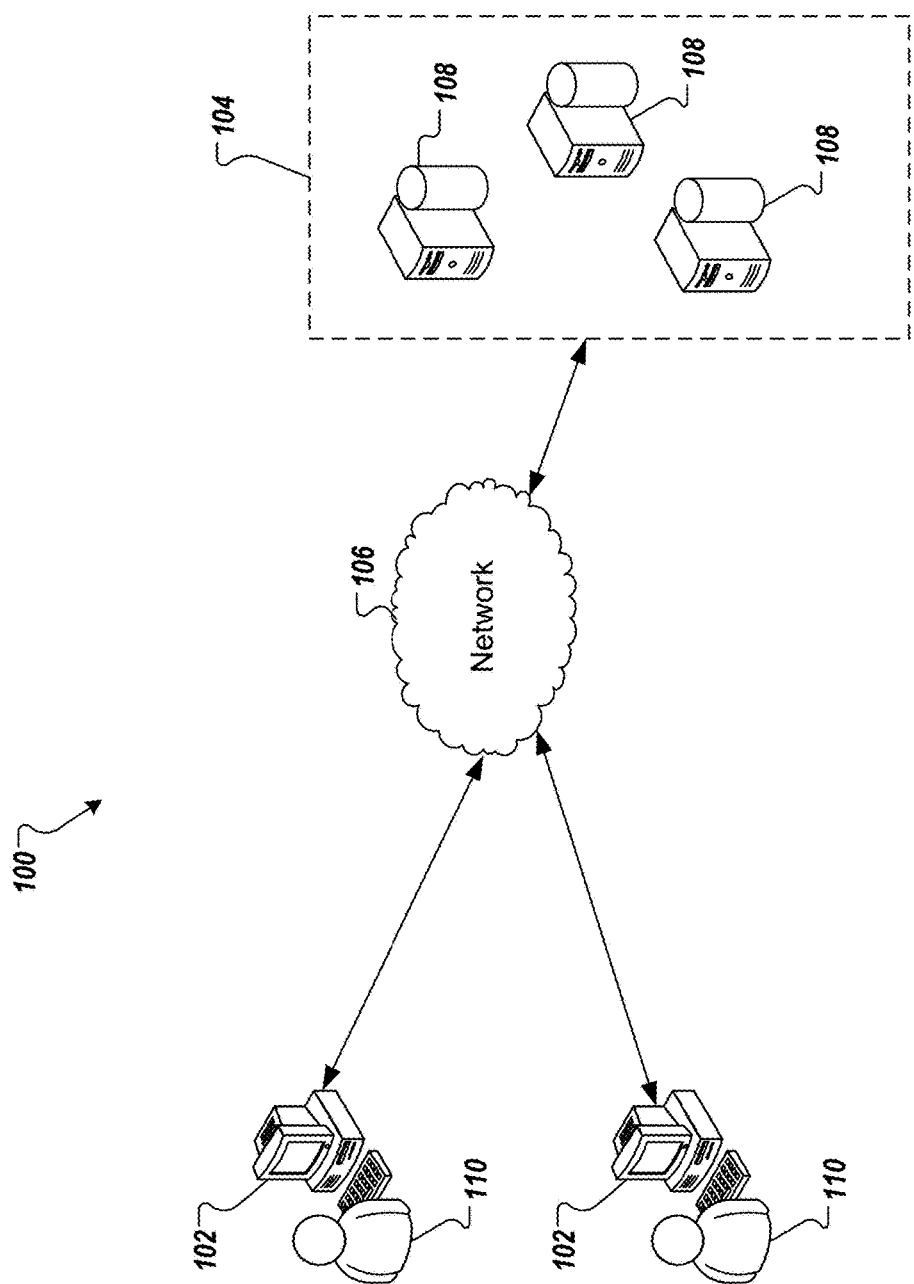
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 110 can include a user, who interacts with an application that is hosted by the server system 104. In another example context, a user 110 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application and/or a database. Example maintenance procedures can include an upgrade procedure, a patch procedure, a configuration procedure, and development and testing procedures.

Implementations of the present disclosure will be described in further detail herein with reference to an upgrade procedure. An example upgrade procedure can include updating software. For example, an application can be updated from a first version (e.g., V1) to a second version (e.g., V2). Example updates can include adding functionality to the application, and/or structural changes to one or more tables stored in one or more databases. As another example, a database can be updated from a first version (e.g., V1) to a second version (e.g., V2). Example updates can include updating a data schema of the database, which can involve structural changes to one or more tables. In some examples, a data schema (also referred to as database schema) is a data structure that defines how data is to be stored in the database. In some examples, the databases schema can be defined in a formal language that is supported by a database management system (DBMS). In general, a data schema can be described as a catalog that specifies all database objects that can be stored in the database. In some examples, different data schemas (e.g., V1 versus V2) can have different objects with the same object name, but different structures.

To provide further context for implementations of the present disclosure, for application servers and/or databases, computer-implemented deploy tools conduct operations to deploy, configure, and/or update an application and/or database as part of one or more maintenance procedures. In some examples, the deploy tools can rely on a certain system state, and execute a sequence of actions, which alter the system. Consequently, during the deployment of a maintenance package (e.g., an upgrade package) to an application server, for example, the system is not in a standard configuration. This can mean, for example, that a table in a database is replaced by a construction of two tables and a database trigger that replicates data from one table to another table. Such a setup, however, does not support deployment of another structural change to the table already being altered, for example. Typically (not using zero downtime), it is not possible to run two deployments (e.g., runtime (V1), target (V2)) at the same time, and they are instead run in a sequence. For example, the second deployment can only be brought online as the first deployment is brought offline.

Traditionally, maintenance procedures (e.g., upgrade) implement a data migration framework for application-specific activities. An example data migration framework includes the eXecute PRogram After import (XPRA) framework provided by SAP SE of Walldorf, Germany. In some examples, the XPRA framework includes calling a XPRA report after the new code and content is deployed, and the persistency structure is adjusted to the new release. In some examples, application developers can provide individual data migration activities using XPRA reports. In some examples, all deploy procedures are based on the transport infrastructure, and thus, all deploy procedures can execute XPRA reports. In some examples, the XPRA framework calls an application-defined report (the XPRA report). The XPRA report can execute all statements possible in the subject programming language (e.g., ABAP, provided by SAP SE), and can alter table structures.

A series of different upgrade and database migration scenarios can be used to respectively optimize different aspects of the deployment. Example scenarios include, without limitation, transport, switch upgrade, near zero downtime upgrade (nZDM), zero downtime upgrade (ZDO), upgrade including migration to another database (DMO), database conversion (e.g., conversion to S/4HANA, provided by SAP SE), and system landscape optimization (SLO). For one or more of these scenarios, it is desirable to run data migration during uptime (e.g., nZDM, ZDM, DMO, database conversion, SLO).

In some examples, the transport scenario (transport approach) includes a transport system performing changes according to a change list, referred to as a transport. There is a static, defined sequence of steps executed to implement the changes to reflect the transport. Example steps can include import of data dictionary metadata (DDIC), computation of a target data dictionary definition (Activation), including new deployed changes and definitions, and providing a generic DB operation to adjust the DB table structures to the data dictionary metadata definition. Example DB operations can include no operation (e.g., no action needed), providing a DB data definition language (DDL) statement (e.g., create table, alter table), and conversion (e.g., through which a new table is created with the new structure and a generic program is called to transfer the data from the old to the new structure including generic type transformations. Example steps can further include executing the DDL and the conversion, importing report sources, classes, and table content, and executing XPRA.

Certain structural changes are not possible with the transport approach, which first creates the target structure of the table, and generically adjusts data types, only afterwards executing application-specific logic operating on the table in the target structure. For example, key changes (e.g., replacing one key field with another, shortening a key field) can lead to data loss, even if there is a mapping mechanism available from old to new keys. As another example, reading data from deleted fields in the migration program is not possible, because the fields are already deleted once the migration is started. More specifically, fields can be deleted, but the content in deleted fields cannot be read/evaluated in the application program, because the target structure is established (meaning the field is dropped), then the program is called. As another example, data is redundantly processed. More specifically, data is processed in the generic conversion, and is then again processed in the XPRA. This results in extended runtime/downtime. These problems can be collectively referred to as structural change problem.

Another problem of traditional approaches can be referred to as a sequence problem. More particularly, the deployment sequence of current approaches is to first adjust the table structure generically, deploy the new code, and then call the application migration program. When the application migration program is used in the generic structure adjustment, the start version of the code is used, because the target version of the code is only deployed afterwards. If a new slot were added to deploy code before the conversion, an intermediary stage would result, and include portions of the start version of the code, and portions of the target version code, which is untenable.

Another problem can be referred to as a zero downtime (ZDM) problem (e.g., downtime minimizing approaches). In some examples, there are limitations using the XPRA framework in downtime minimized procedures. For example, the application program cannot be used in DB triggers for the synchronous replication required in ZDM, because the application migration is executed as an application server program, and, for ZDM, the migration is executed in a DB trigger within the application transaction to write data to the original tables. In some examples, the XPRA runs on content in the target table, and is not working on deltas or using a logging table to determine the required delta to process. Accordingly, XPRA is only able to run in downtime able, and is not usable with downtime minimizing procedures (e.g., during which migration is run in uptime on one state of content, and in downtime on a content delta).

In view of the above context, implementations of the present disclosure provide a data migration framework that includes a single migration class that can be executed to provide data migration logic, and fragments for a code generator. In some examples, the code generator provides procedure-specific migration code. In accordance with implementations of the present disclosure, one or more procedures are extended to include code generators, and reading code fragments from the migration class. In this manner, procedures can include an individually-optimized sequence of operations on data to ensure no data is lost, or is redundantly processed. An example migration class is disclosed in commonly assigned U.S. application Ser. No. 15/285,745, referenced above.

In some implementations, a procedure including downtime creates a target structure of the table including application data migration in a single step. In some examples, this can include using an intermediary structure of the table including "shadow fields," and altering the table structure after the migration to the final structure defined by the software package.

In some examples, a downtime minimizing procedure provides the table in the target (or an intermediary) structure, and executes data migration while transferring data from the original table to the target table. In some examples, the data transfer includes detecting changes resulting from application use, and replicating these changes including data migration incrementally, a final migration in downtime. In some examples, the procedure calls application-specific data migration logic implemented in the application server language, or generates data migration code using the code fragments for incremental processing.

In some examples, a zero downtime procedure provides either a clone table ("shadow table") in a target structure (or intermediary structure), or adding clone columns ("shadow columns") to the table to be migrated for those columns being processed by the migration program. In some examples, the procedure generates database triggers using code fragments provided by the migration class, as well as scripts (e.g., SQL scripts). In some examples, the scripts are used to initially populate the shadow table (or shadow columns), and the database trigger operates on data changed in the original table or columns resulting from application use.

Implementations of the present disclosure build on the multi-procedure support described in U.S. application Ser. No. 15/285,745, which describes an eXecute CLass After import (XCLA) framework that includes an XCLA object, and interfaces. In some examples, the XCLA object is delivered with the application, is detected by the deployment procedure in the application delivery package, and metadata of the XCLA object is evaluated to determine which migration is to be executed. In some examples, the metadata declares which tables and table fields are to be migrated, and which constraints the migration implements. Example constraints can include, without limitation, works on single records (e.g., insert, update, delete), and updates single records only (e.g., update only). Interfaces of the XCLA framework include a properties interface (e.g., XCLA-properties-IF), which provides metadata about the data migration read by the upgrade procedure (e.g., table, table fields, constraint), and a migration interface (e.g., XCLA-migration-IF), which provides the data migration logic.

Figure 2:
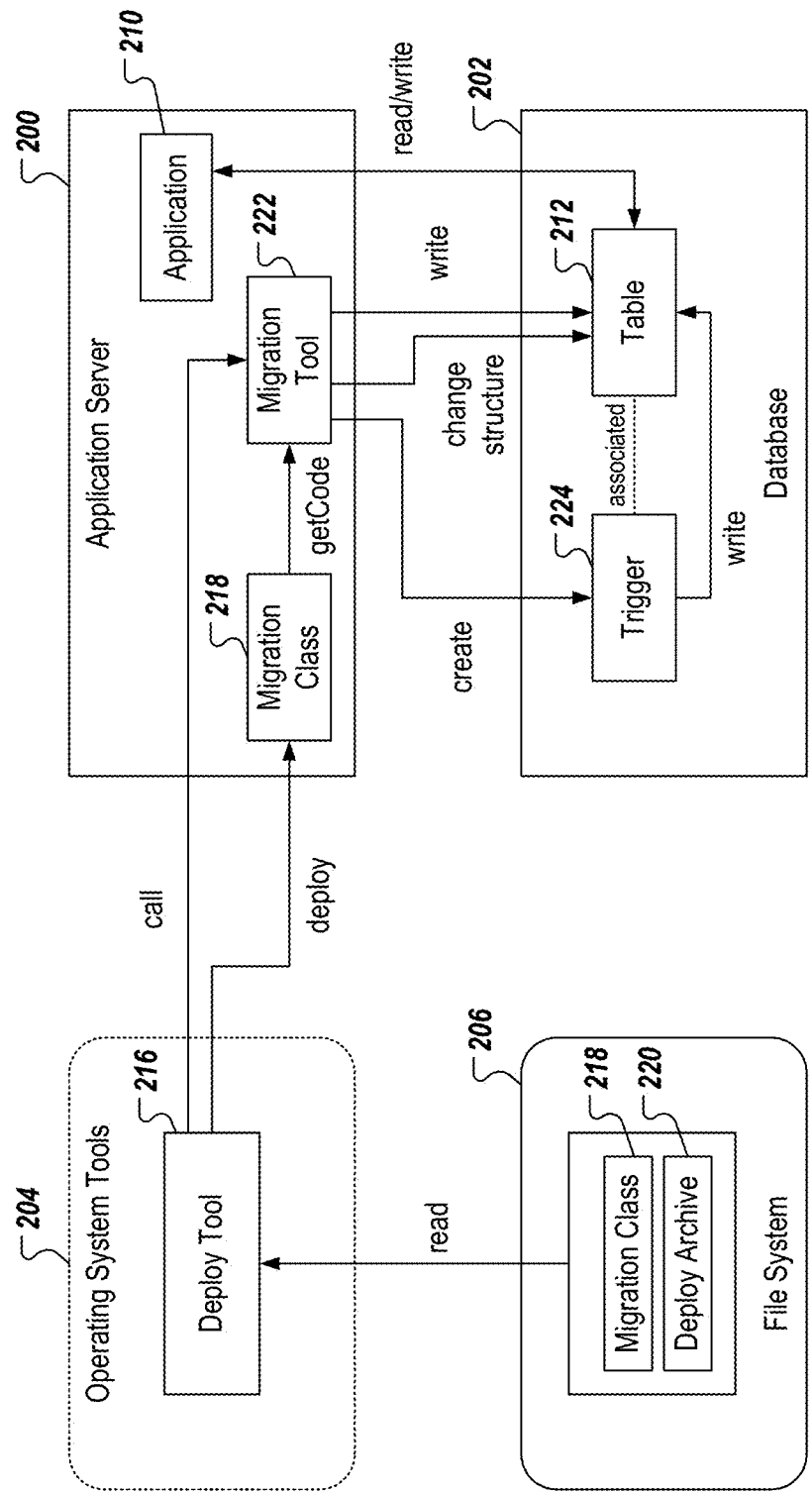
FIG. 2 depicts example components in accordance with implementations of the present disclosure.

FIG. 2 depicts example components in accordance with implementations of the present disclosure. The example components include an application server 200, a database 202, operating system tools 204, and a file system 206. In the depicted example, the applications server 200 executes an application 210 (e.g., an ERP application, a CRM application, a SCM application, a PLM application), which operates (e.g., reads from, writes to) over data stored in a table 212 of the database 202. Although a single table is depicted, implementations of the present disclosure are applicable to any appropriate number of tables 212 stored in the database 202.

In accordance with implementations of the present disclosure, the application 210 undergoes a maintenance procedure (e.g., upgrade from V1 to V2), which include data migration within the database 202. Accordingly, the operating system tools 204 include a deploy tool 216, which is used to deploy the maintenance procedure to upgrade the application 210 on the application server 200, and migrate data within the database 202. An example deploy tool includes the software update manager (SUM) provided by SAP SE. In some examples, the deploy tool 216 reads a migration class, and deploy archive 218 from the file system 206. The deploy tool 216 deploys the migration class 218 to the application server 200, and calls a migration tool 222 executing on the application server 200 to execute the maintenance procedure.

In some examples, the migration tool 222 receives metadata that indicates which tables and table fields are to be migrated as part of the maintenance procedure. In some examples, the migration tool 222 receives code from the migration class 218, and processes the code to provide one or more database (DB) triggers. In the example of FIG. 2, a DB trigger 224 is provided and is associated with the table 212. In some examples, the migration tool 222 issue instructions that are executed by the database 202 to change the structure of, and/or write data to the table 212.

Implementations of the present disclosure extend the XCLA framework to address, among other potential problems, the structural change problem, the sequence problem, and the ZDM problem, discussed above.

With regard to the structure change problem, implementations of the present disclosure provide multiple mechanisms for resolution. The multiple mechanisms include executing the conversion of the structure and the application data in one step, and, if needed, providing an intermediate structure of the table for the migration program. In some implementations, an intermediate table structure (intermediate table) is established, where the intermediate table contains all fields of the original structure (start table), unchanged (including fields, which will be deleted in the target table). In some implementations, the intermediate table contains additional fields ("shadow fields"), which are hidden from the application (e.g., using a projection view on the old fields). In some examples, the fields are assigned a different name to avoid conflict with the field names of the start release structure (e.g., using a GUID column name). In some examples, a shadow field is provided for any existing field having a change in data type, for any existing field, to which the migration will update the content, and for any new field being added. In some examples, a shadow field can be provided for the migration program to store administrative information (e.g., progress of the migration).

In some implementations, the migration program is called to operate on the intermediate table, but is only able to update records, and is only able to update "shadow fields," which are not accessed by the start release (V1) application. In some examples, the migration program is triggered to update records altered by the executing application (e.g., the start release (V1) application). In some implementations, the target table structure (target table) is established. In some examples, a unique key constraint is created on the target key, the unique key constraint is dropped, obsolete fields are dropped, shadow fields are renamed to the target name, temporary fields, if any, are dropped, and the primary key constraint is created. This is described in further detail herein with reference to FIGS. 3A-4H.

With regard to the sequence problem, implementations of the present disclosure provide a namespace pre-fix of the migration classes, which are imported early. In some implementations, the DDIC is imported, the migration classes are deployed, and the target data dictionary definition is determined (e.g., Activation, reference above), which includes the newly deployed changes and definitions in the system. In some examples, generic database operations are determined to adjust the table structures to the DDIC. The result of this can be: no action needed, a DB DDL statement (e.g., create table, alter table, etc.); a conversion (e.g., a new table is created with the new structure and a generic program is called to transfer the data from the old to the new structure including generic type transformations); and an application-specific conversion, which specifies the module to be used for the table conversion. In some examples, the conversion (if any) and DDL are executed. If an application-specific conversion is specified, the application-specific conversion is used. Report sources, classes, and table content are imported, and application-defined reports are executed to adjust their data, if needed (e.g., XPRA).

With regard to consistency, if some classes are imported during deployment of the migration classes, the required data elements are activated during the import of the report sources, classes, and table content. In some examples, classes imported during deployment of the migration classes can be invalid (e.g., data elements used are still the old version, methods called are still the old version). To overcome this problem, implementations of the present disclosure limit the class to be self-contained, such that no data elements and/or methods that are not part of the class may be used or called. To achieve this, the classes to be imported during deployment of the migration class are defined by a namespace (e.g. namespace pre-fix). In this manner, the transport tools can recognize that these classes are to be handled in an exceptional import step, and not the standard import step. Further, development system checks can be implemented to ensure that the class code matches the requirements (e.g., no use of data elements and no calls to other methods than class methods).

With regard to the ZDM problem, a procedure can be provided to copy a table while it is in use in read/write by an application, and to establish a state, at which the source table and the target table are synchronized in each transaction. That is, for example, data is written to the source table and the target table in the same transaction.

In accordance with implementations of the present disclosure, data migration is done completely within one table. In some implementations, the table is extended and modified to match the needs for the conversion, and is modified again to match the target specification. In some implementations, a temporary state of the table is provided, in which an intermediary table structure is established. In some examples, the intermediary table structure can be established by the table including all fields of the original structure unchanged (e.g., including fields, which will be deleted in the target table), and the table including one or more additional (shadow) fields. In some examples, the shadow fields are hidden from the application (e.g., using one or more views, as described with reference to FIGS. 3A-4H), and are assigned names that do not conflict with the name of the start release structure (e.g., using a GUID column name). In some examples, a shadow field is provided for any existing field changing its type, or for which the migration updates the content, and for any new field. In some examples, a shadow field can include a temporary field for the migration program to store administrative information (e.g., maintenance procedure progress data).

In accordance with implementations of the present disclosure, and in order to enable creation of target release views on the table, the fields are switched. In some examples, for any existing field, which has a respective shadow field (e.g., existing fields having change to type, and/or update to content), the original field is renamed (e.g. to a GUID, or by appending "~ORIG"), and the shadow field is renamed to the original name. For new fields and/or temporary fields, switching of fields is not applicable. In some examples, the names of the original fields and their temporary name are stored in a persistency. The projection view in the bridge schema is adjusted to select the original fields with their temporary names. In some examples, a revoke can be executed to drop the target fields, and rename the source release fields to their original name. The target release views are then created in the original schema, and data is cloned (copied) into the shadow fields.

In some implementations, respective triggers are created altering the image of the record to be written. For examples, a trigger can adjust the names of the fields, such that the original fields are adjusted to a temporary name, and the content for the new fields is determined. In some implementations, a batch program is run to read every entry with null-values in the new fields, where the existing content is read (including access to renamed fields), the content for the new fields is determined, and the record is updated. In some examples, new secondary keys are created online.

In some implementations, if a key field may need to be changed. In such cases, a unique constraint is created on the fields, which will be the new primary key after the upgrade. In some examples, this is executed as an online command that does not lock the table completely for the time of the operation (creation of the unique constraint).

After access is switched over to the new application (e.g., V2 accessing the table directly, not through the projection view), the old primary key is dropped, the fields with the temporary names are dropped, and the unique constraint is defined as the new primary key constraint.

FIGS. 3A-3F schematically depict an example maintenance procedure in accordance with implementations of the present disclosure. The example maintenance procedure includes an upgrade procedure from a start version (V1) of an application to a target version (V2) of the application, through which all migration actions are conducted before switching production use from the start version to the target version of the application.

Figure 3A:
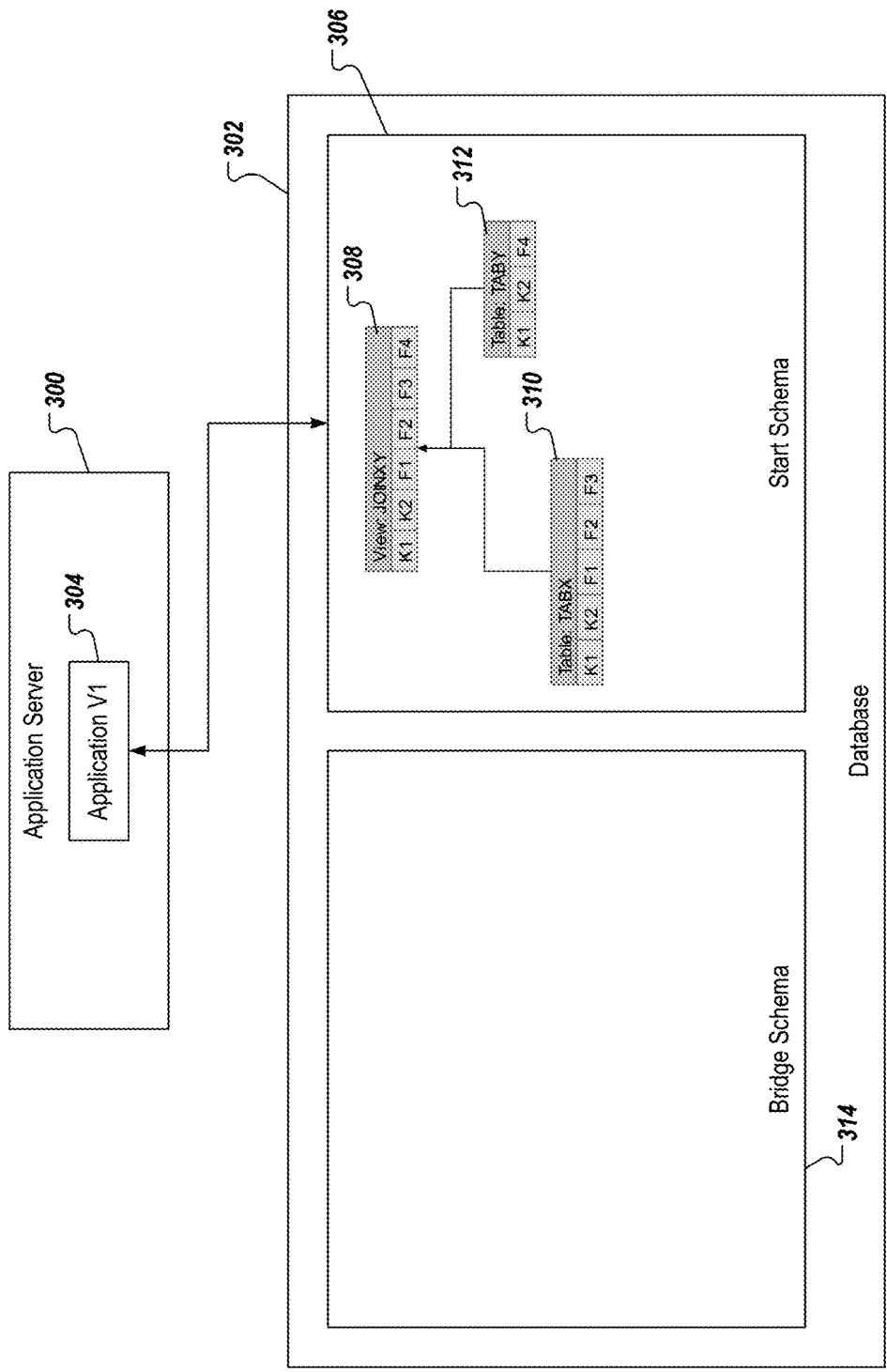
FIGS. 3A-3F schematically depicts an example upgrade procedure in accordance with implementations of the present disclosure.

With particular reference to FIG. 3A, an application server 300, and a database 302 are provided. The application server executes an application 302. In the depicted example, the application 302 is a start version (V1). A so-called start database schema 306 is provided, which, in the depicted example, defines a view 308 (JOINXY) into tables 310, 312 (TABX, TABY, respectively). In the depicted example, the table 310 includes keys K1, K2, and fields, F1, F2, F3, the table 312 includes keys K1, K2, and field F4, and the view 308 is a join of the tables 310, 312. During uptime (e.g., production use of the application 304), the application 304 interacts with the data stored in the database through the start schema 306.

Figure 3B:
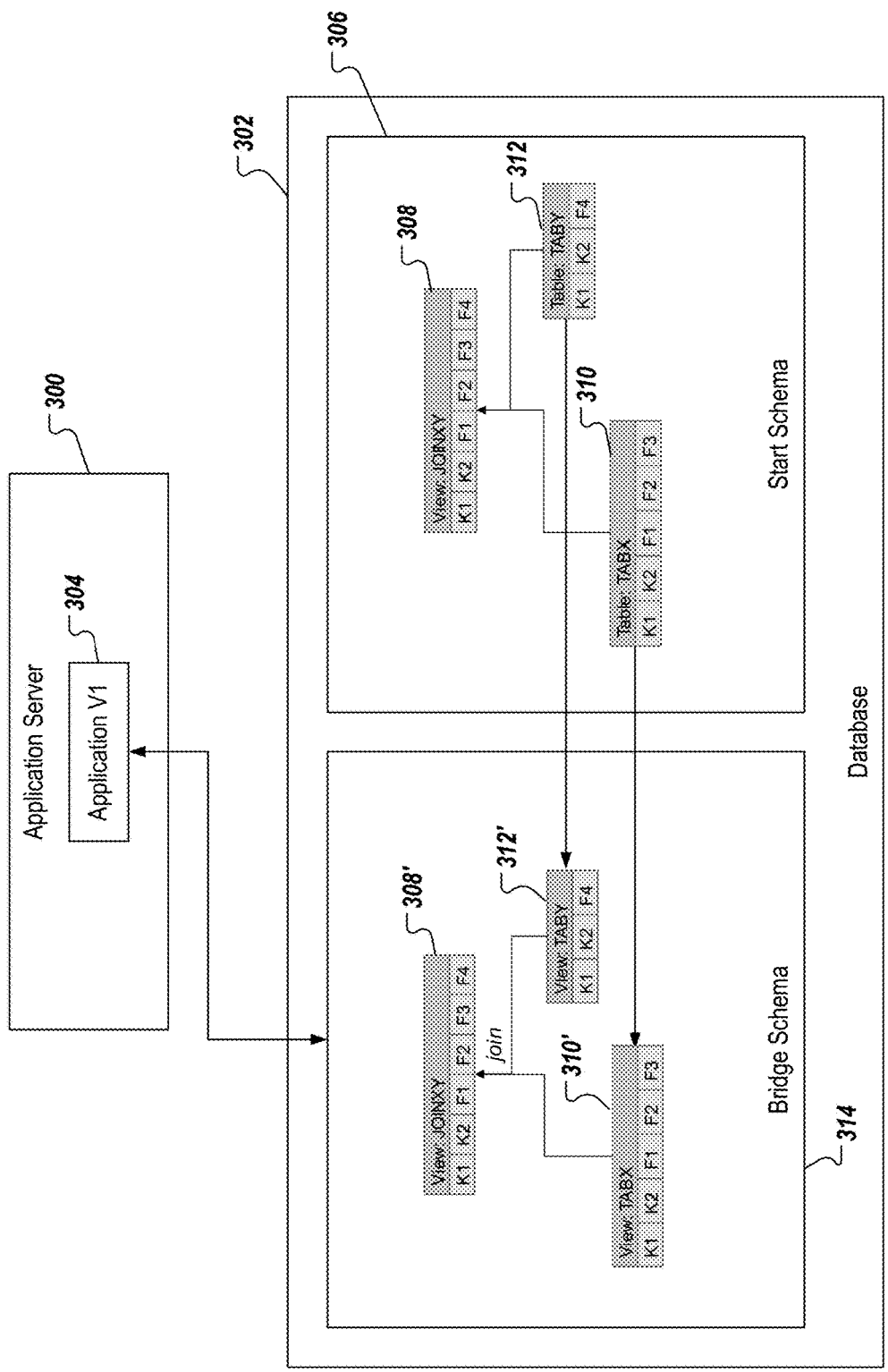

In preparation for execution of the upgrade procedure, a bridge schema 314 is instantiated. In some examples, the bridge schema 314 provides the intermediate structure, discussed above. Referring to FIG. 3B, and in continued preparation for execution of the upgrade procedure, the view 308 is copied to the bridge schema 314 as a view 308', and views 310', 312' are provided, which are views into tables 310, 312, respectively, of the start schema 306. The application 304 is switched to interact with data stored in the database through the bridge schema 314.

Figure 3C:
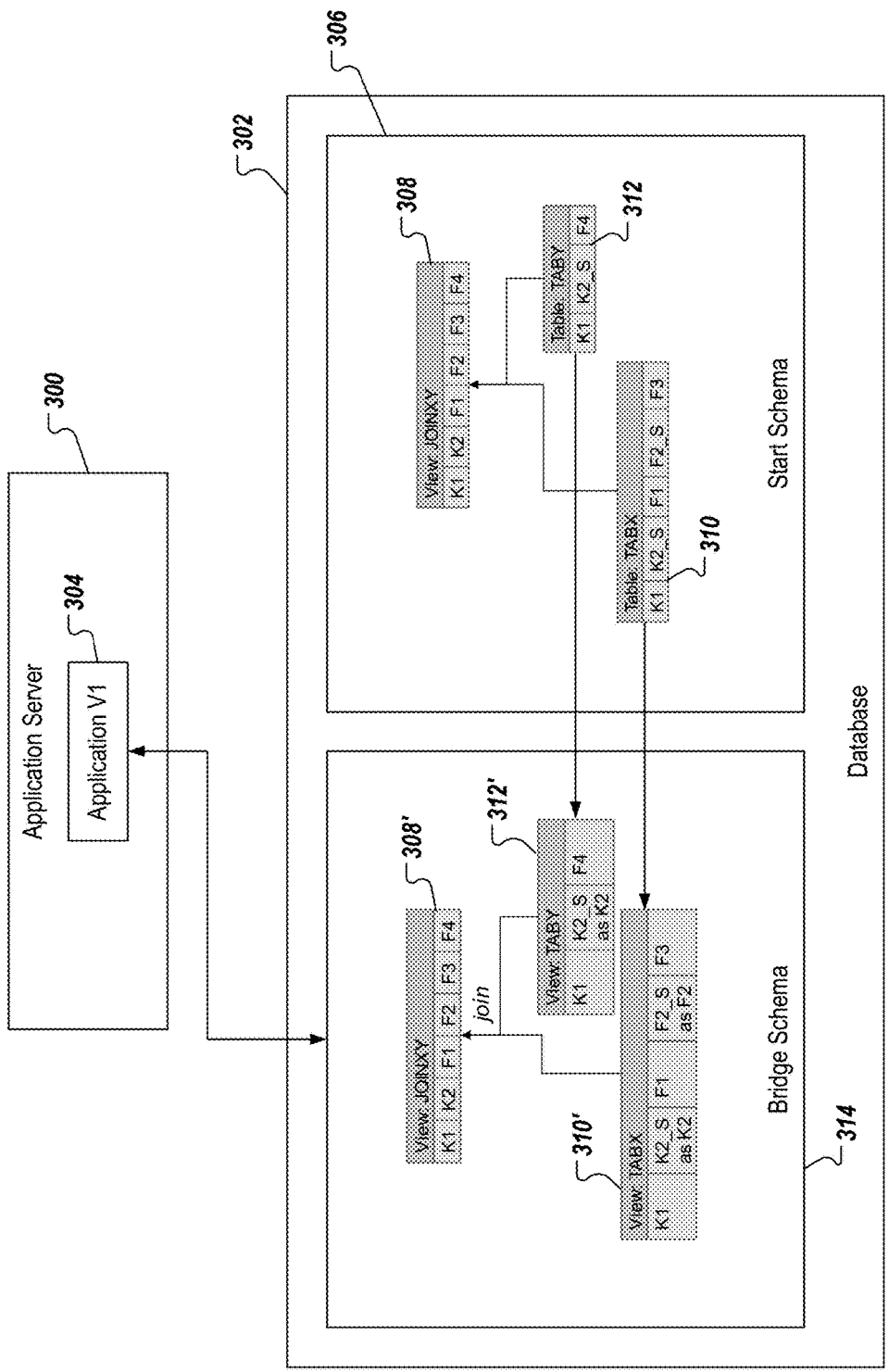

Referring to FIG. 3C, during the upgrade procedure, the bridge schema 314 is upgraded. In the depicted example, the upgrade includes altering the view 310' to select K2_S as K2, and altering the view 312' to select K2_S as K2, and F2_S as F2. Also, in the table 312, the key K2 is renamed to K2_S, and in the table 310, the key K2 is renamed to K2_S, and the field F2 is renamed to F2_S. In some examples, the suffix S indicates a shadow (e.g., shadow column, or shadow table).

Figure 3D:
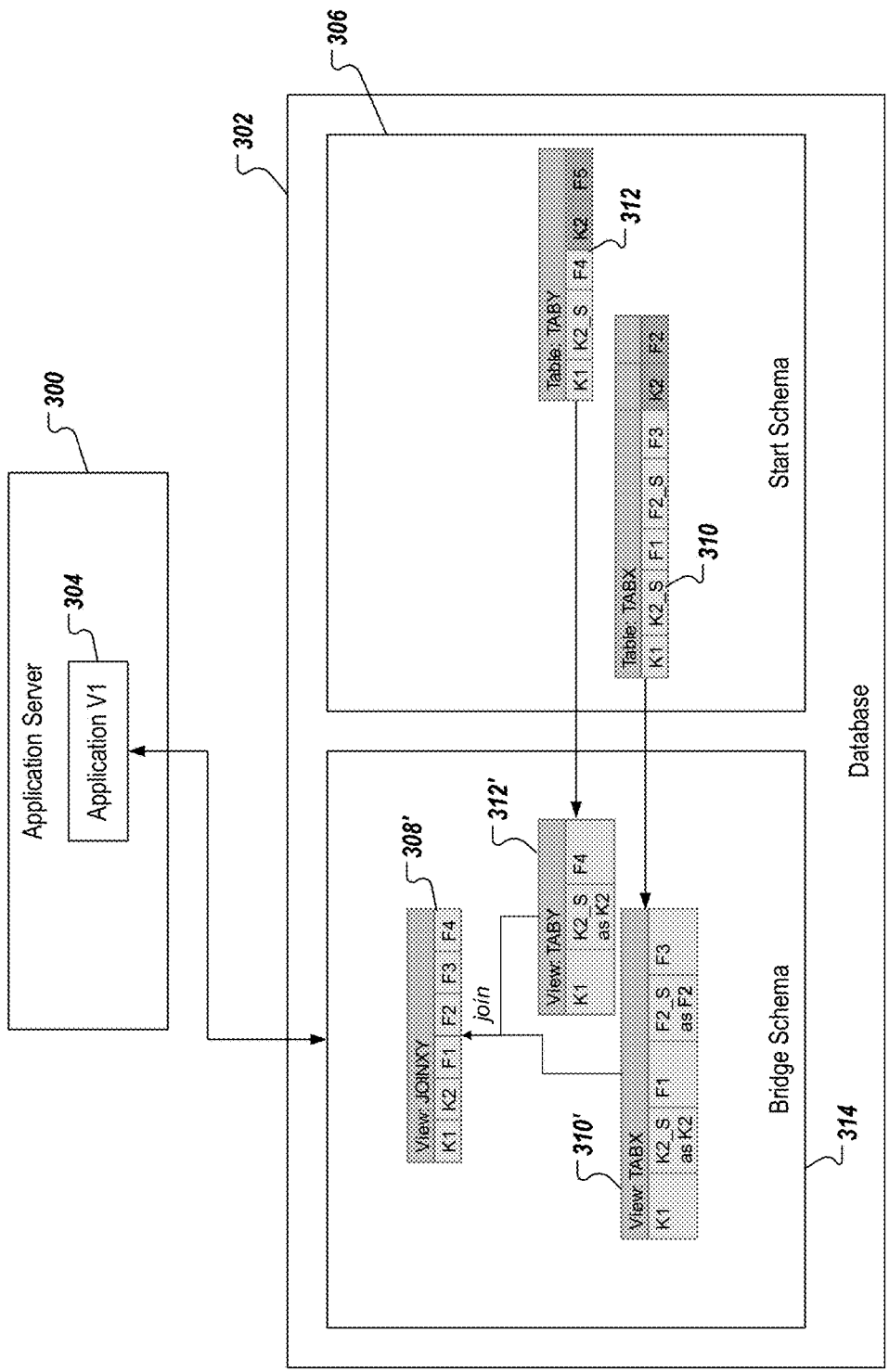

Referring to FIG. 3D, the view 308 has been dropped, the table 312 has been edited to include a target version of the key K2, and a target version of a field F5 (e.g., the target version of the key K2 is different than the original version of the key K2, and the field F5 is a new field). Further, the table 310 has been edited to include the target version of the key K2, and a target version of the field F2 (e.g., the target version of the field F2 is different than the original version of the field F2).

Figure 3E:
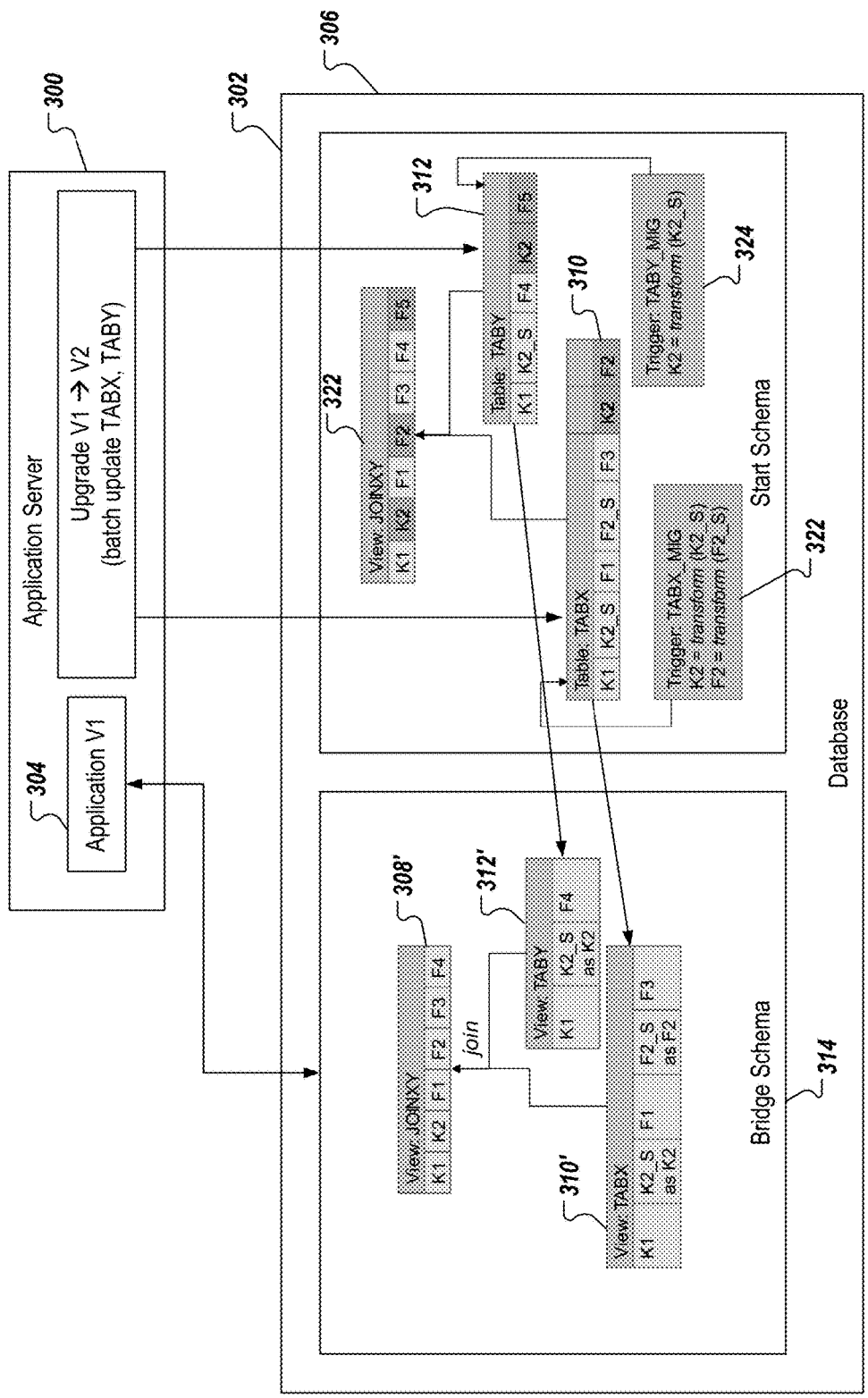

Referring to FIG. 3E, the upgrade continues with upgrading the application from the start version V1 to the target version V2, which, in the depicted example, includes batch updates to the tables 310, 312. A view 320 is created, which is a join of the tables 310, 312 (as upgraded). In the depicted example, triggers 322, 324 are provided, and are assigned to tables 310, 312, respectively. During the upgrade and data migration, the start version of the application 304 makes production use of the database through the bridge schema 314, acting on the tables 308, 310 using the respective triggers 322, 324.

Figure 3F:
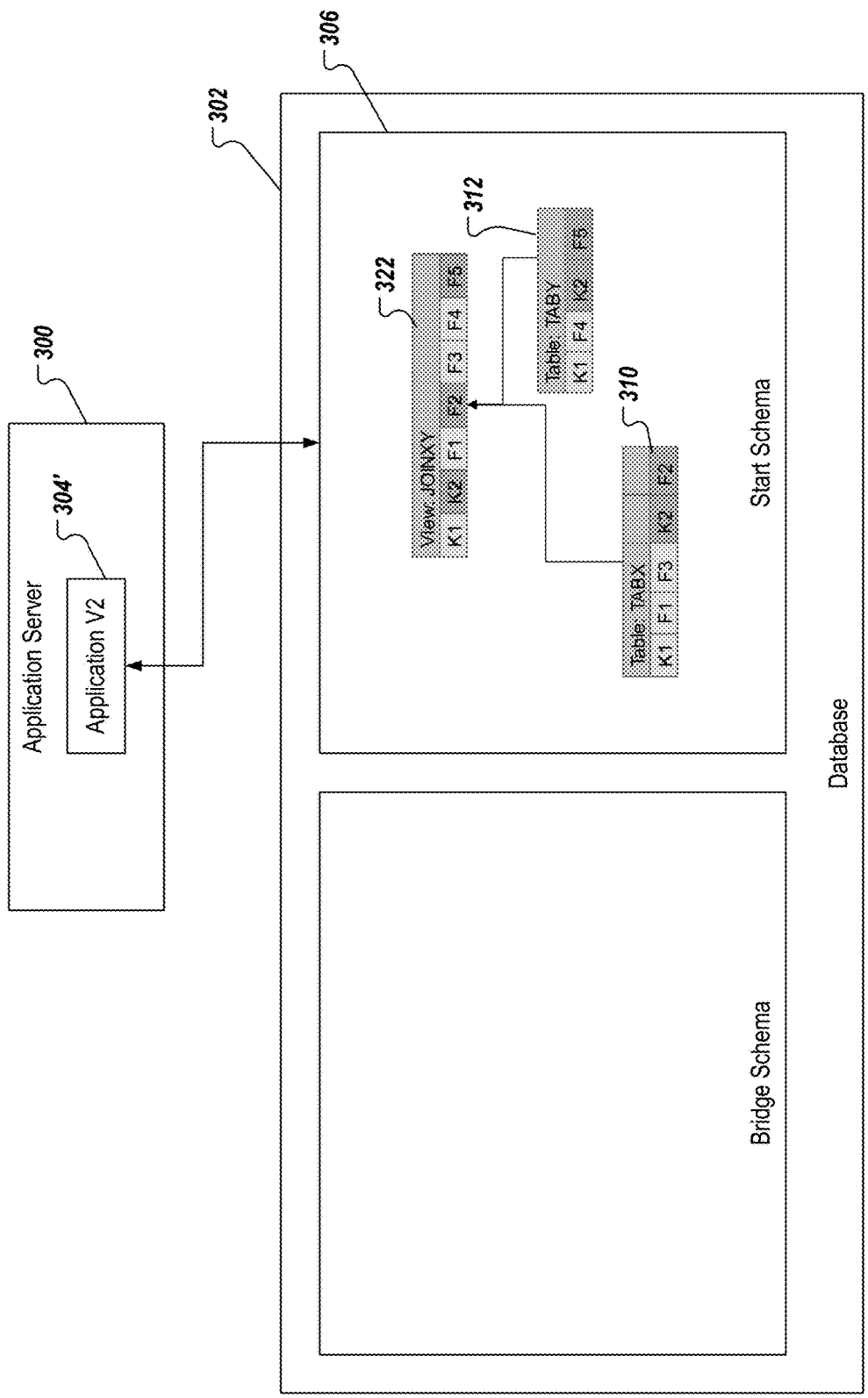

Referring to FIG. 3F, after the upgrade and data migration, the application server 300 switches to the target version (V2) of the application 304', such that the application 304' interacts with the database 302 through the start schema 306. Accordingly, the views 310', 312' of the bridge schema 314 are deleted, and the triggers 322, 324 are deleted from the start schema 406. Further, the unused columns of the tables 310, 312 (e.g., the key K2_S, the field F2_S) are deleted. The application 304' continues in production use based on the start schema 306, as depicted in FIG. 3F.

FIGS. 4A-4H schematically depict an example maintenance procedure in accordance with implementations of the present disclosure. The example maintenance procedure includes an upgrade procedure from a start version (V1) of an application to a target version (V2) of the application, through which all migration actions are conducted after switching production use from the start version to the target version of the application.

Figure 4A:
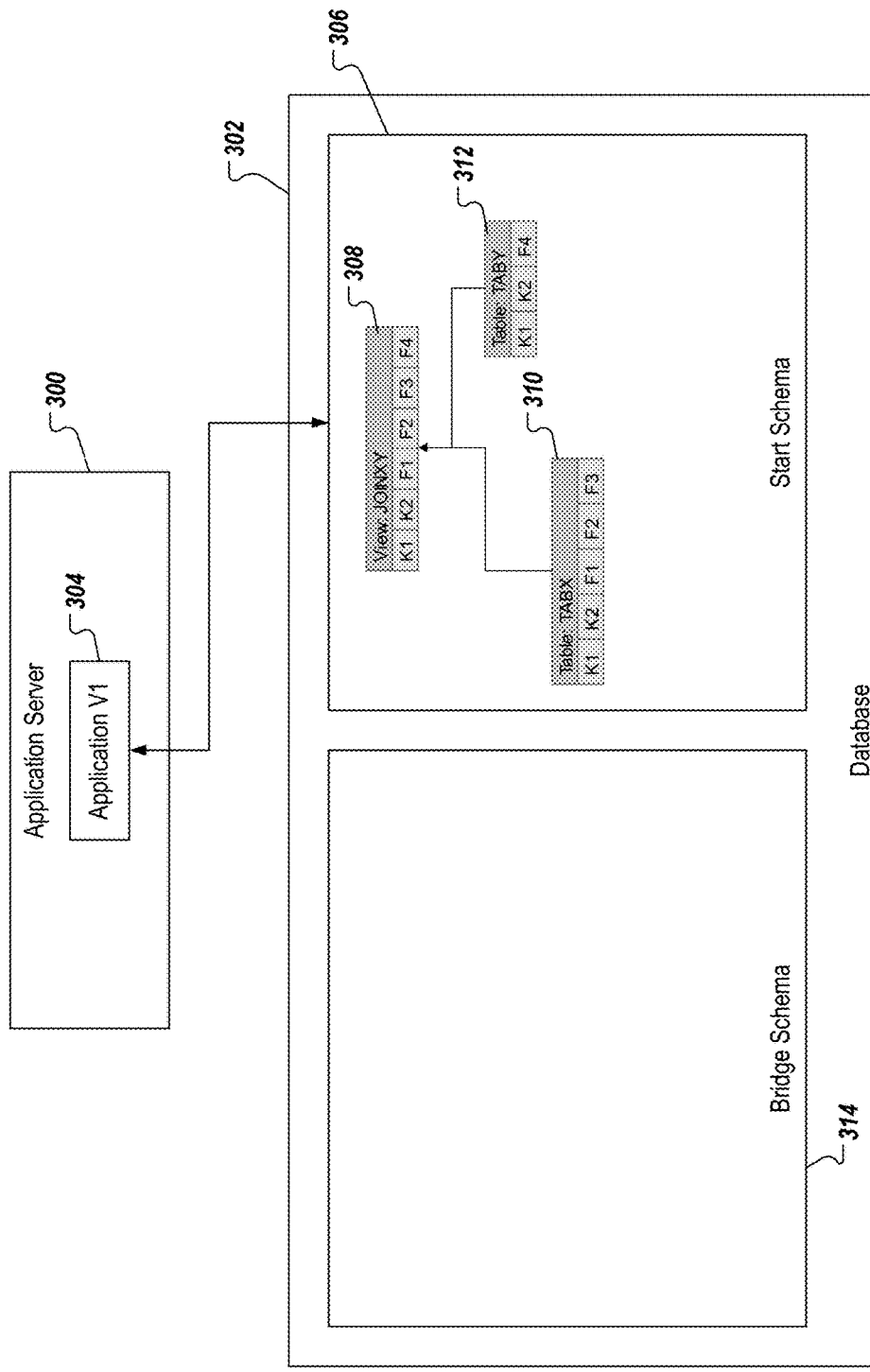
FIGS. 4A-4H schematically depicts an example upgrade procedure in accordance with implementations of the present disclosure.

With particular reference to FIG. 4A, the application server 300, and the database 302 are provided. The application server executes the application 304. In the depicted example, the application 304 is a start version (V1). The database schema 306 is provided, which, in the depicted example, defines the view 308 (JOINXY) into the tables 310, 312 (TABX, TABY, respectively). In the depicted example, the table 310 includes keys K1, K2, and fields, F1, F2, F3, the table 312 includes keys K1, K2, and field F4, and the view 308 is a join of the tables 310, 312. During uptime (e.g., production use of the application 304), the application 304 interacts with the data stored in the database through the start schema 306.

Figure 4B:
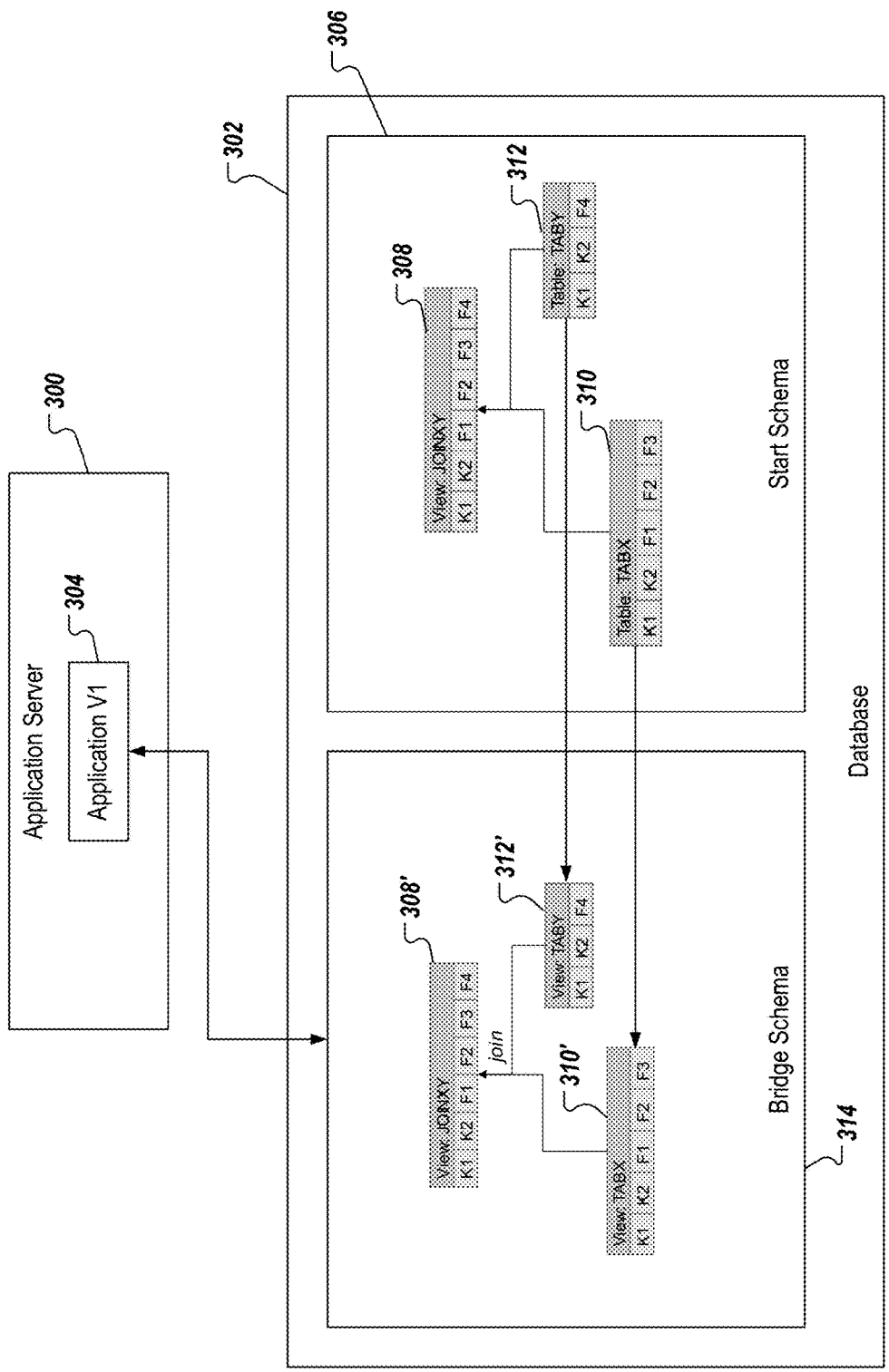

In preparation for execution of the upgrade procedure, a bridge schema 314 is instantiated. In some examples, the bridge schema 314 provides the intermediate structure, discussed above. Referring to FIG. 4B, and in continued preparation for execution of the upgrade procedure, the view 308 is copied to the bridge schema 314 as a view 308', and views 310', 312' are provided, which are views into tables 310, 312, respectively, of the start schema 306. The application 304 is switched to interact with data stored in the database through the bridge schema 314.

Figure 4C:
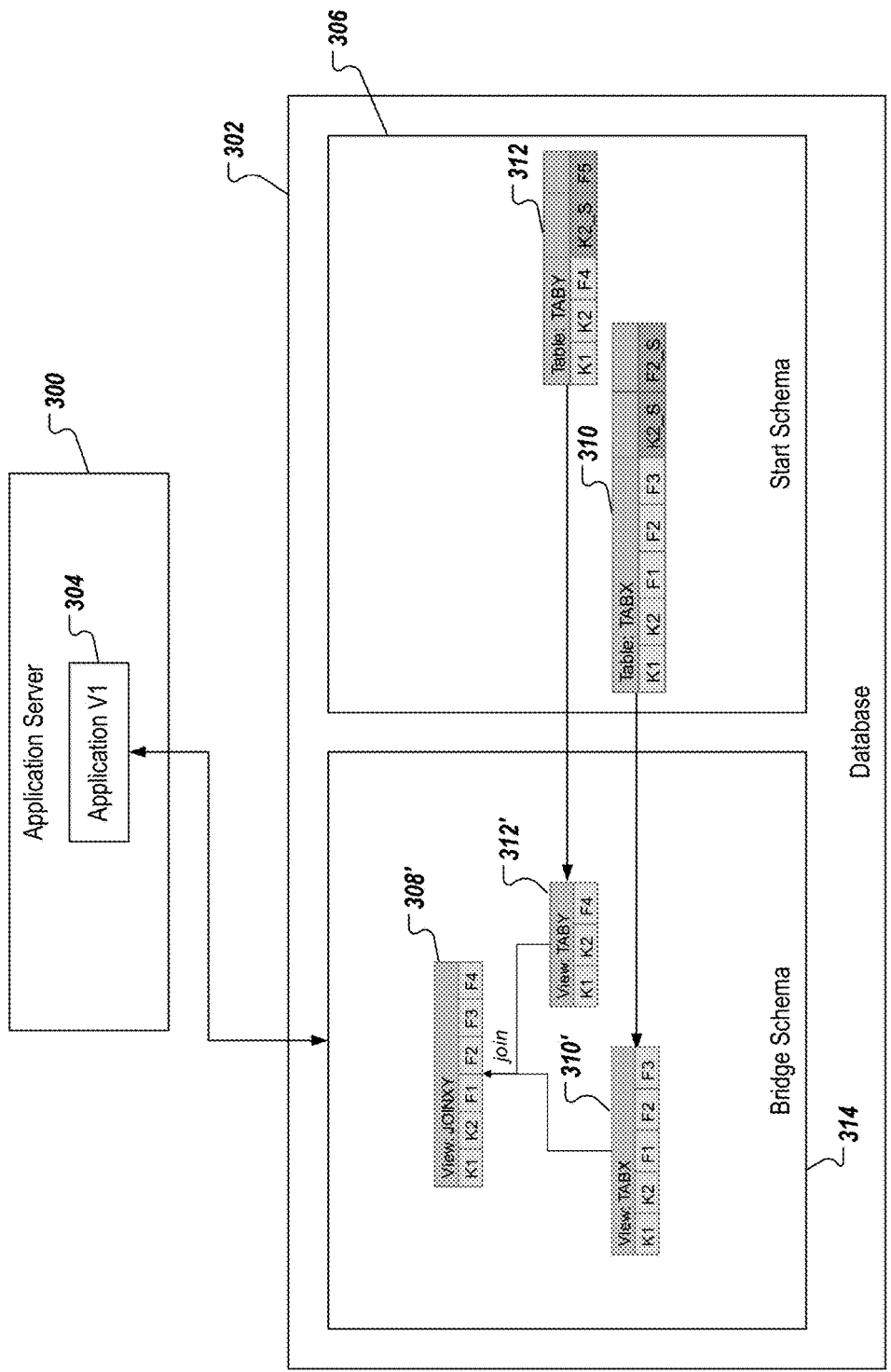

Referring to FIG. 4C, the view 308 is deleted from the start schema 306, and the table 310 is edited to include a target version (K2_S) of the key K2, and a target version (F2_S) of the field F2 (e.g., the target version of the key K2 is different than the original version of the key K2, and the target version of the field F2 is different than the original version of the field F2). Further, the table 312 has been edited to include the target version (K2_S) of the key K2, and a field F5 (e.g., the field F5 is a new field).

Figure 4D:
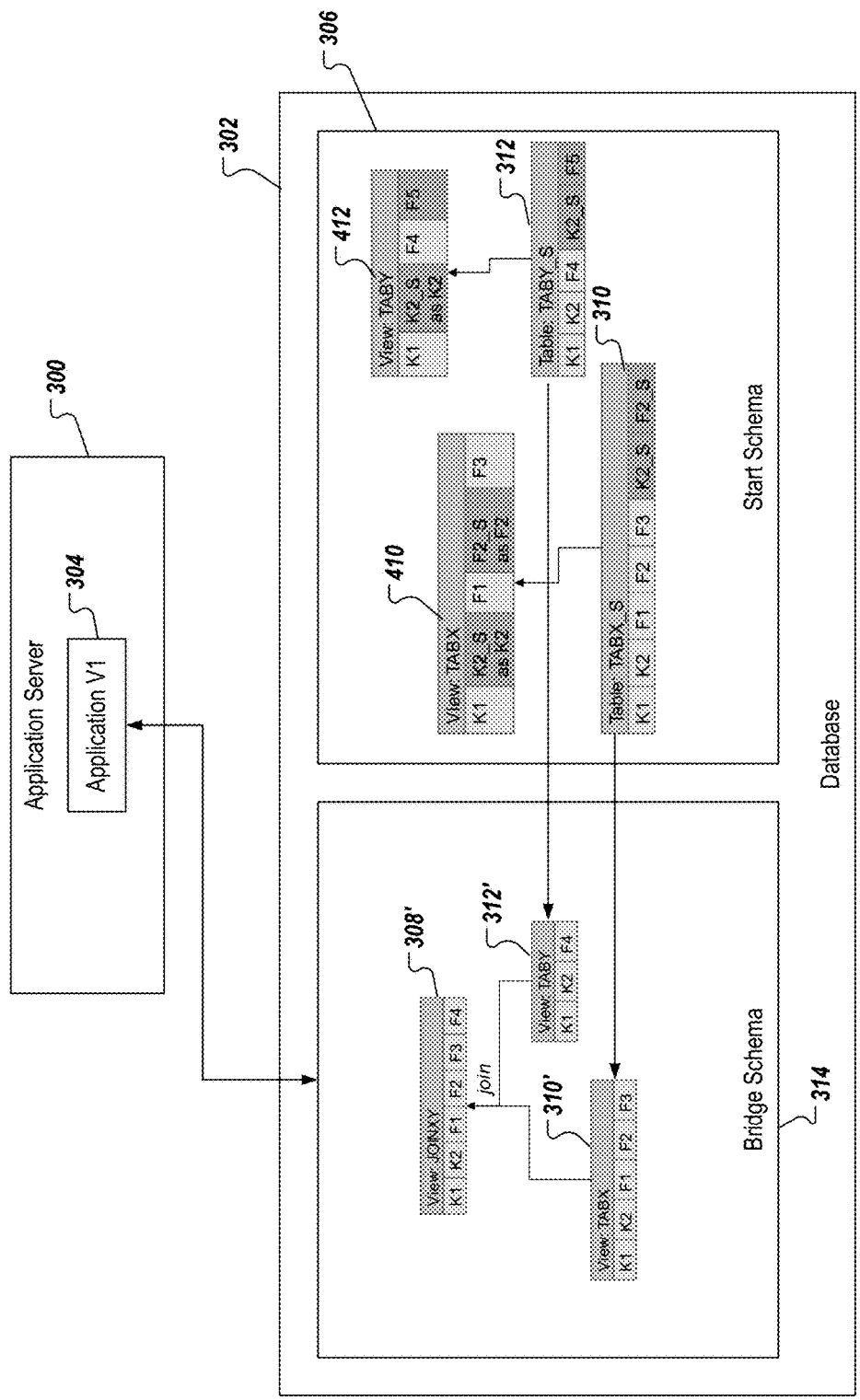

Referring to FIG. 4D, the table 310 and the table 312 are renamed as shadow tables (e.g., TABX_S, TABY_S). A view 410 into the table 310, and a view 412 into the table 312 are added. In the depicted example, the view 410 includes the key K1, the key K2_S as the key K2, the field F1, the field F2_S as the field F2, and the field F3. The view 402 includes the key K1, the key K2_S as the key K2, the field F4, and the field F5.

Figure 4E:
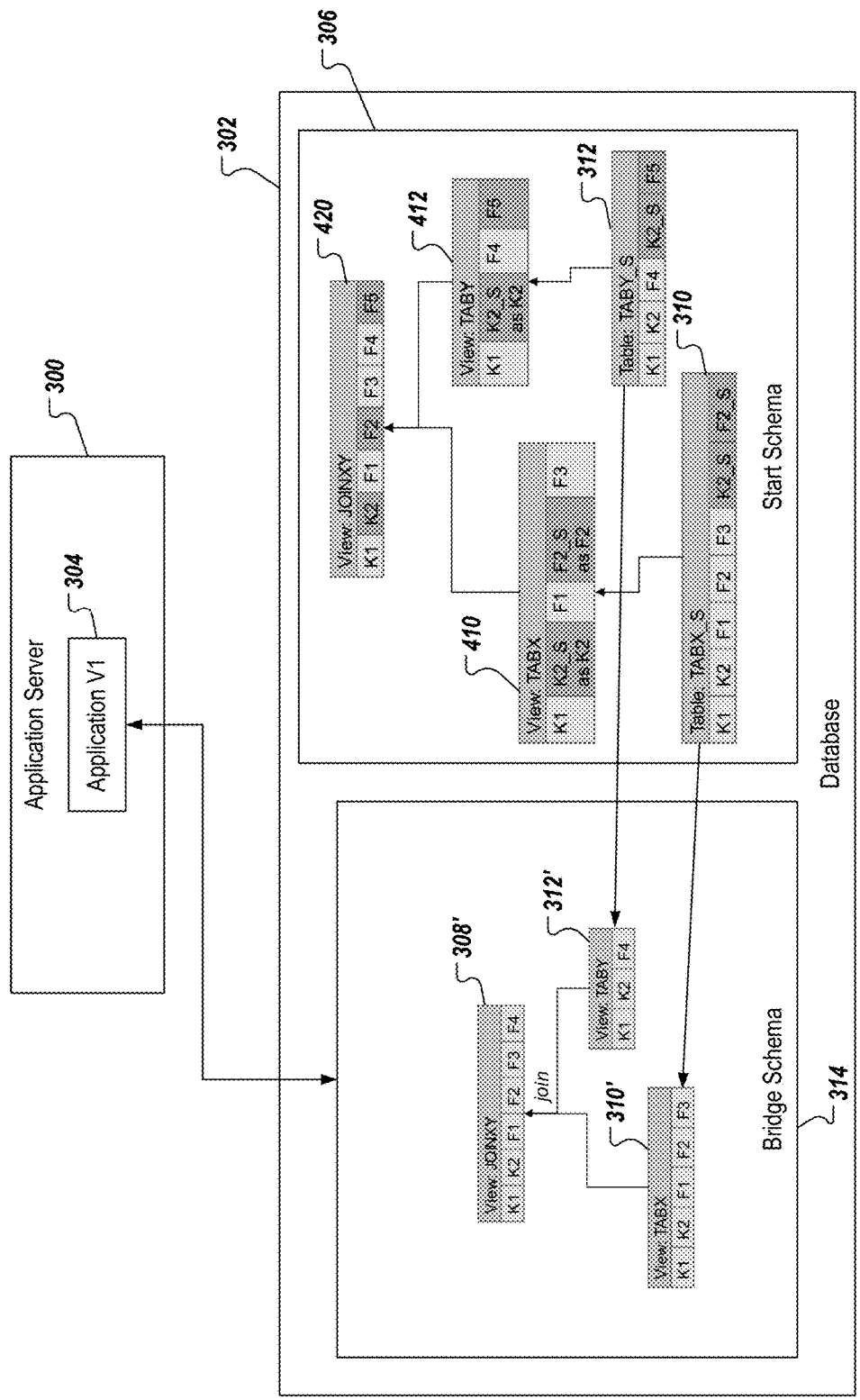

Referring to FIG. 4E, a view 420 is added to the start schema 306. In the depicted example, the view 420 is a join of the tables 310, 312 through the views 410, 412, respectively. The view 420 includes the keys K1, K2, and the fields F1, F2, F3, F4, F5. Accordingly, the view 420 provides a view into the key K2_S and the field F2_S of the table 310, for example, because the view 410 treats the key K2 as the key K2_S, and the field F2 as the field F2_S. In other words, if the view 420 requests data of the key K2 from the view 410, the view 410 retrieves data from the key K2_S of the table 310, and returns the data to the view 420, as if from the key K2.

Figure 4F:
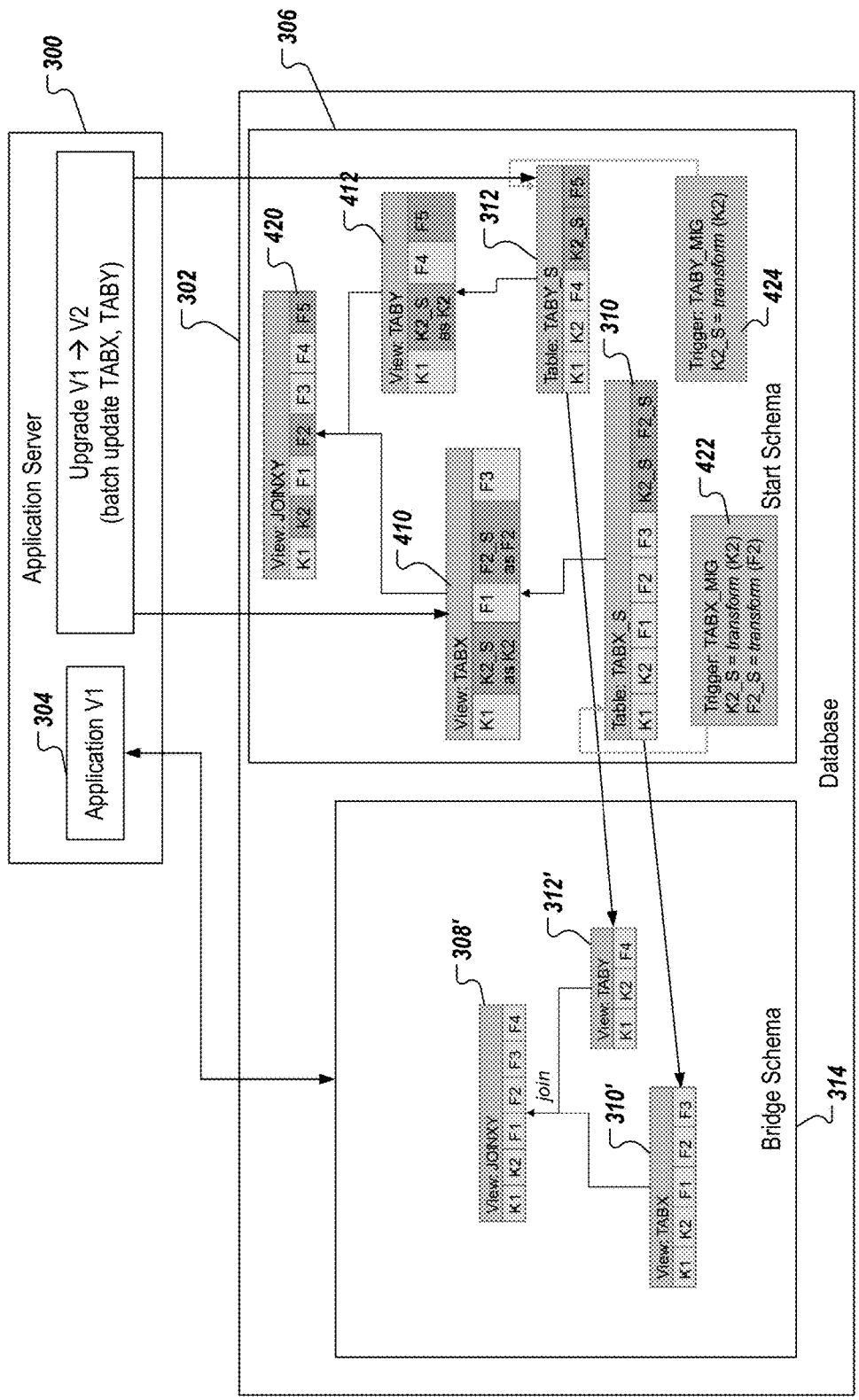

Referring to FIG. 4F, the upgrade continues with upgrading the application from the start version V1 to the target version V2, which, in the depicted example, includes batch updates to the tables 310, 312. In the depicted example, triggers 422, 424 are provided, and are assigned to tables 310, 312, respectively. During the upgrade and data migration, the start version of the application 304 makes production use of the database through the bridge schema 314, acting on the tables 308, 310 using the respective triggers 422, 424.

Figure 4G:
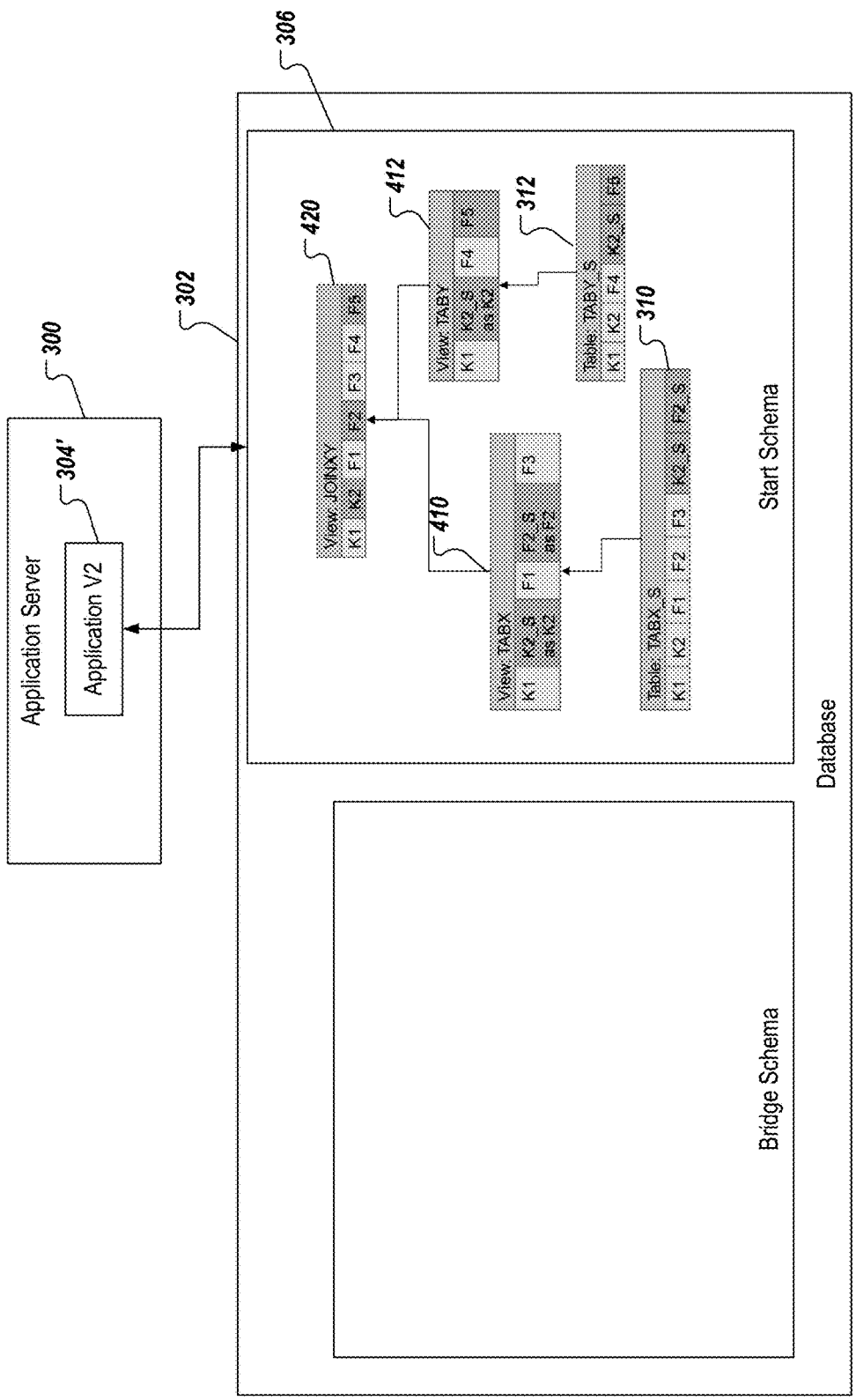

Referring to FIG. 4G, the application server 300 switches to the target version (V2) of the application 304', such that the application 304' interacts with the database 302 through the start schema 306. Accordingly, the views 310', 312' of the bridge schema 314 are deleted, and the triggers 422, 424 are deleted from the start schema 406.

Figure 4H:
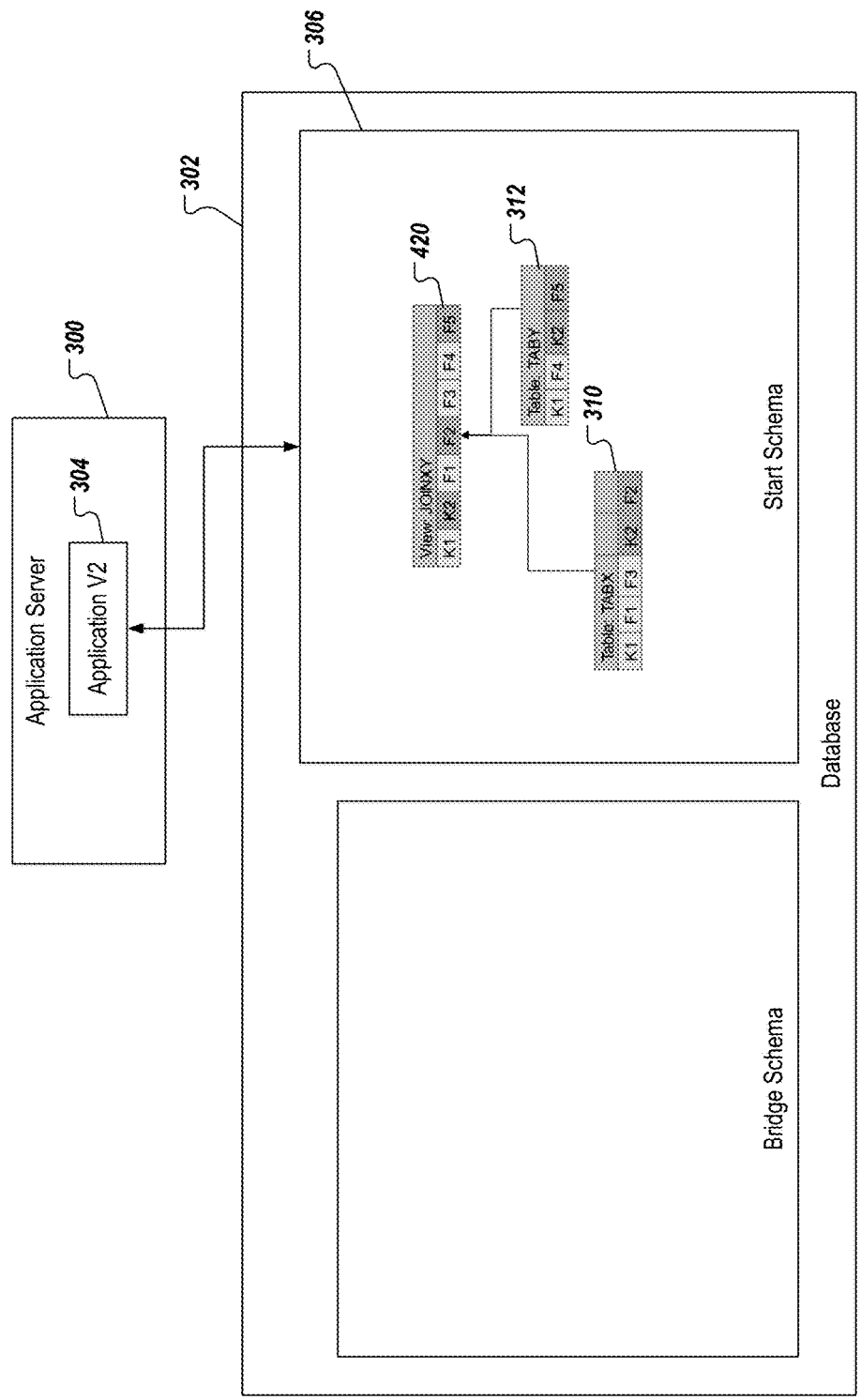

Referring to FIG. 4H, the original key K2 is deleted from the tables 310, 312, and the key K2_S is renamed as K2 (i.e., the key K2_S replaces the key K2), and the field F2 is deleted from the table 310, and the field F2_S is renamed as F2 (i.e., the field F2_S replaces the field F2). Further, the views 410, 412 are deleted, and the view 420 is directly associated with the tables 310, 312, which are respectively renamed with their original names (e.g., TABX, TABY).

Figure 5:
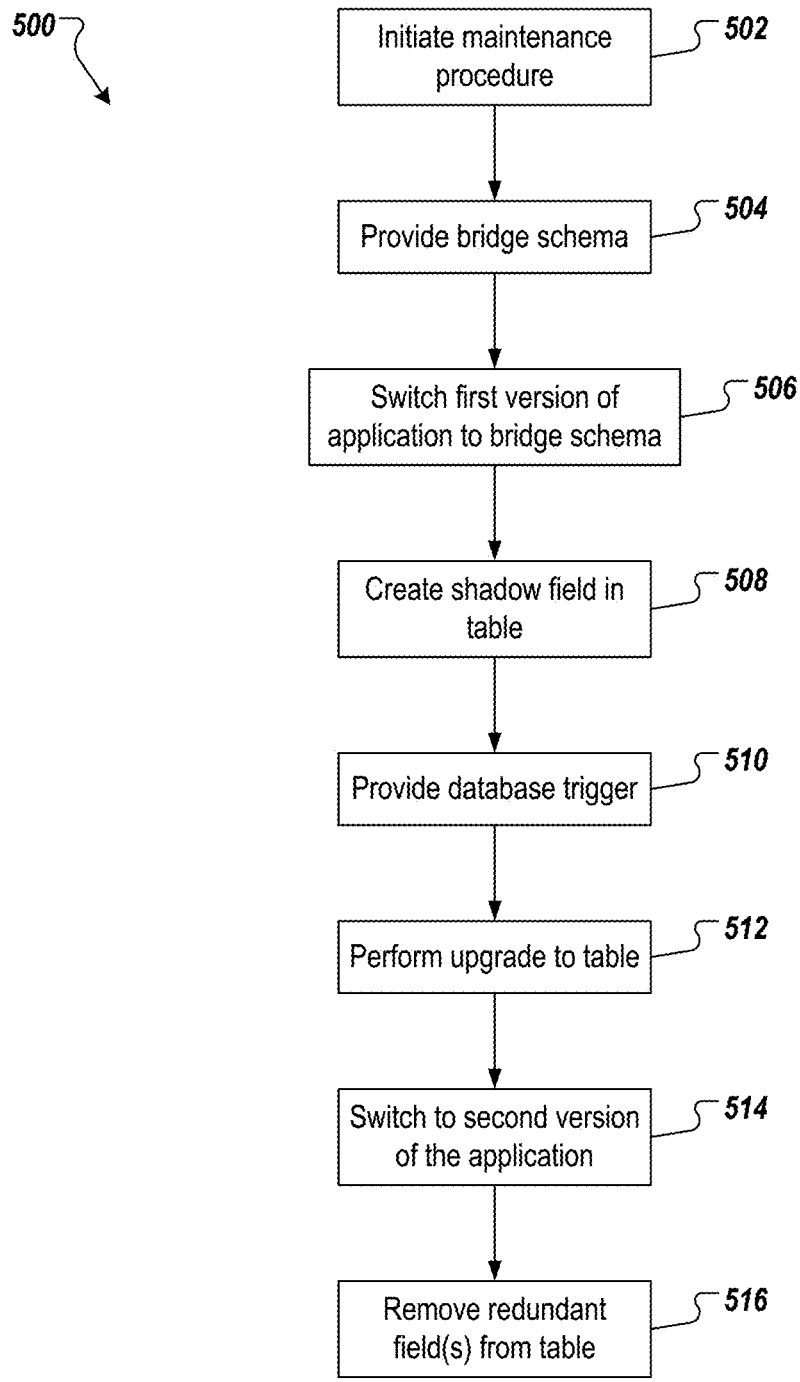
FIG. 5 depicts an example process that can be executed in accordance with implementations of the present disclosure.

FIG. 5 depicts an example process 500 that can be executed in accordance with implementations of the present disclosure. In some examples, the example process 500 can be provided by one or more computer-executable programs executed using one or more computing devices. In some examples, the example process 500 is executed for data migration in a maintenance procedure executed on a software system. For example, the maintenance procedure is initiated, and the example process 500 is executed.

A maintenance procedure is initiated (502). For example, the deploy tool 216 of FIG. 2 initiates the maintenance procedure (e.g., upgrade) in the applications server 200. In some examples. maintenance procedure executes on a computer-executable application that interacts with a plurality of tables of a database system, the database system providing a start schema, through which a first version of the application interacts with the plurality of tables, the start schema comprising the plurality of tables (e.g., see FIGS. 3A-4H). A bridge schema is provided in the database system (504). In some examples, the bridge schema includes respective table views to each table of the plurality of tables of the start schema. A first version of the application is switched to interact with the plurality of tables through the bridge schema (506). For example, the first version of the application interacts with the tables through the respective table views of the bridge schema (e.g., see FIGS. 3B-3E, and 4B-4F). A shadow field is created in a table of the plurality of tables of the database system (508). In some examples, the shadow field corresponds to a field of the table that is to undergo a change during an upgrade from the first version of the application to a second version of the application. At least one database trigger is provided in the start schema (see FIGS. 3E and 4F). In some examples, the at least one database trigger selectively executes a transformation between the field and the shadow field during the upgrade. The table in the start schema is modified to a target structure (512). In some examples, the modification includes changing at least one parameter of one of the shadow field and the field of the table. The second version of the application is switched to interact with the plurality of tables through the start schema (514). Redundant fields are removed from the table of the start schema (516).

Figure 6:
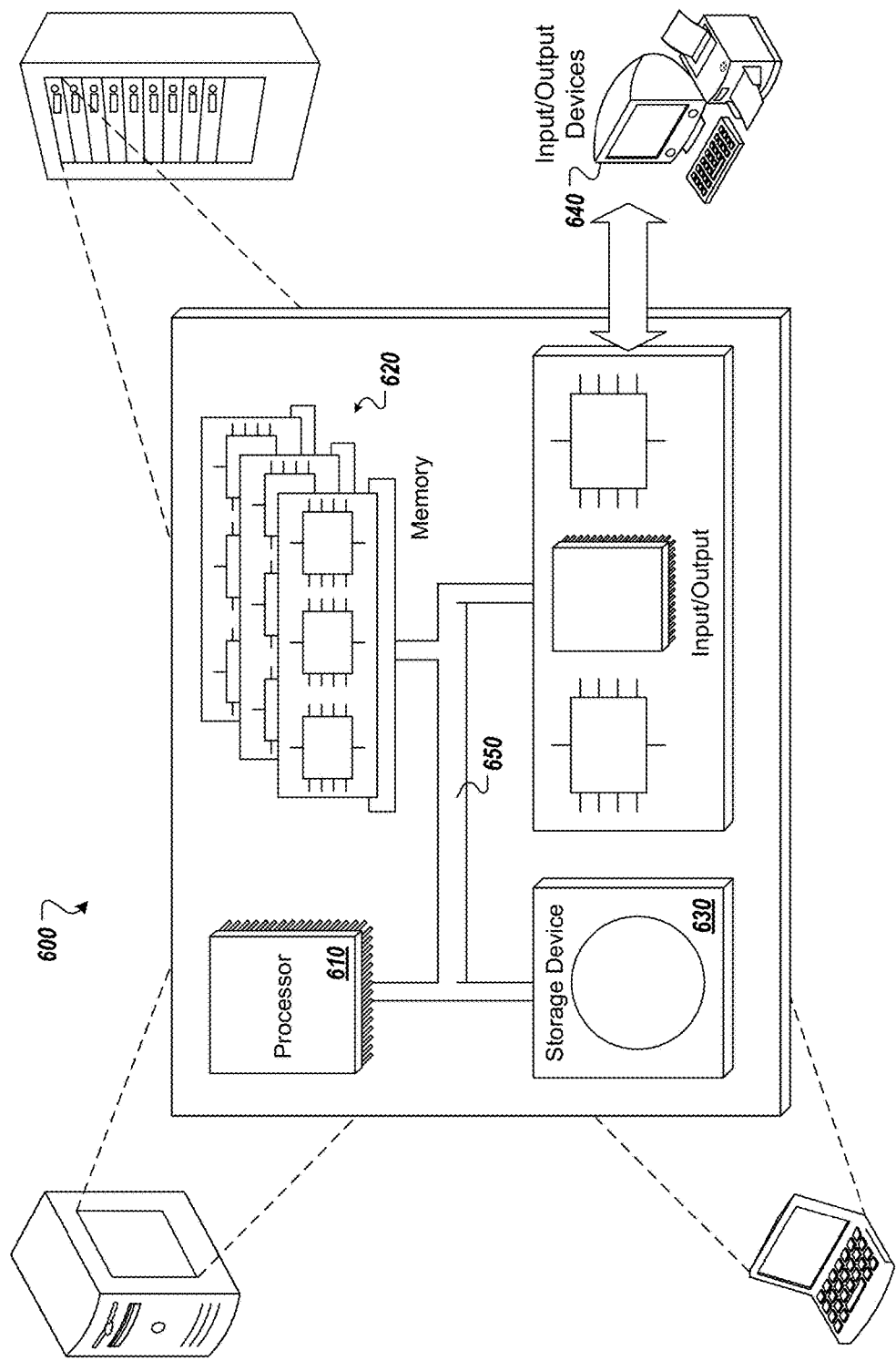
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for data migration in a maintenance procedure executed on a software system, the method being executed using one or more processors and comprising:
    initiating, by the one or more processors, a maintenance procedure on a computer-executable application that interacts with a plurality of tables of a database system, the database system providing a start schema, through which a first version of the application interacts with the plurality of tables, the start schema comprising the plurality of tables;
    providing, by the one or more processors, a bridge schema in the database system, the bridge schema comprising respective table views to each table of the plurality of tables of the start schema;
    switching, by the one or more processors, the first version of the application to interact with the plurality of tables through the bridge schema;
    creating, by the one or more processors, a shadow field in a table of the plurality of tables of the database system, the shadow field corresponding to a field of the table that is to undergo a change during an upgrade from the first version of the application to a second version of the application comprising a functionality different from the first version of the application;
    providing, by the one or more processors, at least one database trigger in the start schema, the at least one database trigger selectively executing a transformation between the field and the shadow field during the upgrade;
    modifying, by the one or more processors, the table in the start schema to a target table structure, by changing at least one parameter of one of the shadow field and the field of the table; and
    switching, by the one or more processors, the second version of the application to interact with the plurality of tables through the start schema.

2. The method of claim 1, wherein creating the shadow field comprises renaming the field from an original name to a new name, and adding the shadow field in the table, the shadow field comprising the original name.

3. The method of claim 2, further comprising modifying at least one table view of the bridge schema to reference the new name.

4. The method of claim 1, further comprising adding a temporary table view to the start schema, the temporary table view referencing the shadow field, which includes a new name with respect to an original name of the field.

5. The method of claim 4, wherein the respective table view of the bridge schema remains unchanged.

6. The method of claim 1, further comprising deleting the at least one database trigger in the start schema prior to switching the second version of the application to interact with the plurality of tables through the start schema.

7. The method of claim 1, wherein the change comprises one or more of a data type change, and a content change.

8. A non-transitory computer-readable storage medium coupled to one or more processors and having instructions stored thereon which, when executed by the one or more processors, cause the one or more processors to perform operations for data migration in a maintenance procedure executed on a software system, the operations comprising:
    initiating a maintenance procedure on a computer-executable application that interacts with a plurality of tables of a database system, the database system providing a start schema, through which a first version of the application interacts with the plurality of tables, the start schema comprising the plurality of tables;
    providing a bridge schema in the database system, the bridge schema comprising respective table views to each table of the plurality of tables of the start schema;
    switching the first version of the application to interact with the plurality of tables through the bridge schema;
    creating a shadow field in a table of the plurality of tables of the database system, the shadow field corresponding to a field of the table that is to undergo a change during an upgrade from the first version of the application to a second version of the application comprising a functionality different from the first version of the application;
    providing at least one database trigger in the start schema, the at least one database trigger selectively executing a transformation between the field and the shadow field during the upgrade;
    modifying the table in the start schema to a target table structure, by changing at least one parameter of one of the shadow field and the field of the table; and
    switching the second version of the application to interact with the plurality of tables through the start schema.

9. The computer-readable storage medium of claim 8, wherein creating the shadow field comprises renaming the field from an original name to a new name, and adding the shadow field in the table, the shadow field comprising the original name.

10. The computer-readable storage medium of claim 9, wherein operations further comprise modifying at least one table view of the bridge schema to reference the new name.

11. The computer-readable storage medium of claim 8, wherein operations further comprise adding a temporary table view to the start schema, the temporary table view referencing the shadow field, which includes a new name with respect to an original name of the field.

12. The computer-readable storage medium of claim 11, wherein the respective table view of the bridge schema remains unchanged.

13. The computer-readable storage medium of claim 8, wherein operations further comprise deleting the at least one database trigger in the start schema prior to switching the second version of the application to interact with the plurality of tables through the start schema.

14. The computer-readable storage medium of claim 8, wherein the change comprises one or more of a data type change, and a content change.

15. A system, comprising:
a computing device; and
a computer-readable storage device coupled to the computing device and having instructions stored thereon which, when executed by the computing device, cause the computing device to perform operations for data migration in a maintenance procedure executed on a software system, the operations comprising:
initiating a maintenance procedure on a computer-executable application that interacts with a plurality of tables of a database system, the database system providing a start schema, through which a first version of the application interacts with the plurality of tables, the start schema comprising the plurality of tables;
providing a bridge schema in the database system, the bridge schema comprising respective table views to each table of the plurality of tables of the start schema;
switching the first version of the application to interact with the plurality of tables through the bridge schema;
creating a shadow field in a table of the plurality of tables of the database system, the shadow field corresponding to a field of the table that is to undergo a change during an upgrade from the first version of the application to a second version of the application comprising a functionality different from the first version of the application;
providing at least one database trigger in the start schema, the at least one database trigger selectively executing a transformation between the field and the shadow field during the upgrade;
modifying the table in the start schema to a target table structure, by changing at least one parameter of one of the shadow field and the field of the table; and
switching the second version of the application to interact with the plurality of tables through the start schema.

16. The system of claim 15, wherein creating the shadow field comprises renaming the field from an original name to a new name, and adding the shadow field in the table, the shadow field comprising the original name.

17. The system of claim 16, wherein operations further comprise modifying at least one table view of the bridge schema to reference the new name.

18. The system of claim 15, wherein operations further comprise adding a temporary table view to the start schema, the temporary table view referencing the shadow field, which includes a new name with respect to an original name of the field.

19. The system of claim 18, wherein the respective table view of the bridge schema remains unchanged.

20. The system of claim 15, wherein operations further comprise deleting the at least one database trigger in the start schema prior to switching the second version of the application to interact with the plurality of tables through the start schema.

* * * * *